United States Patent
Zaugg

(10) Patent No.: US 7,362,420 B2
(45) Date of Patent: Apr. 22, 2008

(54) ENTANGLED-PHOTONS RANGE FINDING SYSTEM AND METHOD

(75) Inventor: Thomas Zaugg, Ypsilanti, MI (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 230 days.

(21) Appl. No.: 11/088,205

(22) Filed: Mar. 24, 2005

(65) Prior Publication Data

US 2007/0002307 A1 Jan. 4, 2007

Related U.S. Application Data

(60) Provisional application No. 60/555,699, filed on Mar. 24, 2004.

(51) Int. Cl.
*G01C 3/08* (2006.01)

(52) U.S. Cl. .................... 356/5.01; 356/4.01; 356/5.08

(58) Field of Classification Search ............... 356/5.01, 356/4.01, 5.08
See application file for complete search history.

(56) References Cited

U.S. PATENT DOCUMENTS

| | | | |
|---|---|---|---|
| 4,225,938 A | 9/1980 | Turpin | |
| 4,286,328 A | 8/1981 | Bocker | |
| 4,468,093 A | 8/1984 | Brown | |
| 4,521,107 A * | 6/1985 | Chaborski et al. | 356/5.06 |
| 4,633,427 A | 12/1986 | Bocker | |
| 5,001,530 A * | 3/1991 | Kurianski et al. | 257/228 |
| 5,339,182 A | 8/1994 | Kimble et al. | |
| 5,357,331 A * | 10/1994 | Flockencier | 356/5.08 |
| 5,420,905 A | 5/1995 | Bertozzi | |
| 5,594,543 A | 1/1997 | de Groot et al. | |
| 5,796,477 A | 8/1998 | Teich et al. | |
| 5,825,465 A | 10/1998 | Nerin et al. | |
| 5,917,322 A | 6/1999 | Gershenfeld et al. | |
| 6,057,541 A | 5/2000 | Steenblik | |
| 6,252,665 B1 | 6/2001 | Williams et al. | |
| 6,289,104 B1 | 9/2001 | Patterson et al. | |
| 6,314,189 B1 | 11/2001 | Motoyoshi et al. | |
| 6,424,665 B1 | 7/2002 | Kwiat et al. | |
| 6,430,345 B1 | 8/2002 | Dultz et al. | |
| 6,444,999 B1 | 9/2002 | Tomita | |

(Continued)

FOREIGN PATENT DOCUMENTS

EP 1091240 4/2001

(Continued)

OTHER PUBLICATIONS

Rarity et al., Experimental demonstration of single photon rangefinding using parametric downconversion, Applied Optics, vol. 29, No. 19, Jul. 1, 1990, pp. 2939-2943.*

(Continued)

*Primary Examiner*—Thomas H. Tarcza
*Assistant Examiner*—Timothy A Brainard
(74) *Attorney, Agent, or Firm*—Hunton & Williams LLP

(57) ABSTRACT

A method of determining a distance to an object is presented. A first photon and a second photon are simultaneously generated. The first photon is reflected off an object. The second photon is directed to an optical cavity. An arrival of the first photon is correlated with an arrival of the second photon, and the distance to the object is at least partially determined using the correlation.

48 Claims, 13 Drawing Sheets

U.S. PATENT DOCUMENTS

| | | | |
|---|---|---|---|
| 6,473,719 B1 | 10/2002 | Steenblik | |
| 6,480,283 B1 | 11/2002 | Williams et al. | |
| 6,522,749 B2 | 2/2003 | Wang | |
| 6,646,727 B2 | 11/2003 | Saleh et al. | |
| 6,678,054 B1 | 1/2004 | Dress et al. | |
| 2002/0018290 A1 | 2/2002 | Birk et al. | |
| 2002/0018494 A1 | 2/2002 | Vieira et al. | |
| 2002/0020819 A1 | 2/2002 | Wolleschensky et al. | |
| 2002/0036775 A1 | 3/2002 | Wolleschensky et al. | |
| 2002/0071110 A1* | 6/2002 | Barricau et al. | 356/28.5 |
| 2002/0080683 A1* | 6/2002 | Chiang et al. | 367/138 |
| 2002/0093632 A1 | 7/2002 | Teich et al. | |
| 2002/0109840 A1 | 8/2002 | Wolleschensky et al. | |
| 2002/0140941 A1* | 10/2002 | Pedigo | 356/450 |
| 2003/0002670 A1 | 1/2003 | Wang | |
| 2003/0086138 A1 | 5/2003 | Pittman et al. | |
| 2004/0036877 A1 | 2/2004 | Sergienko et al. | |
| 2004/0100637 A1* | 5/2004 | Teich et al. | 356/497 |
| 2004/0208638 A1 | 10/2004 | Jansen | |
| 2005/0135620 A1* | 6/2005 | Kastella et al. | 380/256 |
| 2005/0199812 A1 | 9/2005 | Shih | |

FOREIGN PATENT DOCUMENTS

| | | |
|---|---|---|
| WO | WO 02/45468 A2 | 6/2002 |
| WO | WO 03/019282 A2 | 3/2003 |
| WO | WO 03/019283 A2 | 3/2003 |
| WO | WO 03/019284 A2 | 3/2003 |

OTHER PUBLICATIONS

Strekalov et al., Two-photon processes in faint biphoton fields, pp. 1-18, downloaded Mar. 9, 2005, http://arxiv.org.
Enzer et al., Entangled-photon six-state quantum cryptography, New Journal of Physics 4 (2002) 45.1-45.8.
Gatti et al., Multi-photon, multi-mode polarization entanglement in parametric down-conversion, pp. 1-22 (download date unknown), http://arxiv.org.
Bouwmeester et al., Experimental quantum teleportation, Nature, vol. 390, Dec. 11, 1997, pp. 575-579.
Sciarrino et al., Delayed-choice entanglement swapping with vacuum-one-photon quantum states, Physical Review A, 66, 024309 (2002).
Sergienko et al., Quantum cryptography with femtosecond parametric down conversion, Quantum Imaging Laboratory, pp. 1-8.
Altepeter et al., Ancilla-assisted quantum process tomography, Physical Review Letters, vol. 90, No. 19, May 16, 2003, 193601- to 193601-4.
Oneil, Quantum information studies, Department of Experimental Physics, {http://www.may.ie/academic/physics/quantum.shtml}, printed Feb. 25, 2004, 2 pages.
Giacomini et al., Active teleportation of a quantum bit, Physical Review A, 66, 030302(R) (2000).
Jost et al., Spatial correlations of spontaneously down-converted photon pairs detected with a single-photon-sensitive CCD camera, Optics Express 81, Jul. 20, 1998, vol. 3, No. 2.
Caetano et al., Quantum image control through polarization entanglement in parametric down-conversion, Physical Review A 68, 023805 (2003).
Barbosa, Twin photons entangled in polarization and angular momentum, Eur. Phys. J. D22, 433-440 (2003).
Ribeiro et al., Image and coherence transfer in the stimulated down-conversion process, Physical Review A, vol. 60, No. 6, Dec. 1999, 5074-5078.
Monken et al., Transfer of angular spectrum and image formation in spontaneous parametric down-conversion, Physical Review A, vol. 57, No. 4, Apr. 1998, 3123-3126.
Ribeiro et al., Observation of image transfer and phase conjugation in stimulated down-conversion, Physical Review Letters, vol. 87, No. 13, Sep. 24, 2001, 133602-1 to 133602-4.
Fonseca et al., Quantum interference by a nonlocal double slit, Physical Review A, vol. 60, No. 2, Aug. 1999, 1530-1533.
Atature et al., Entanglement in cascaded-crsytal parametric down-conversion, Physical Review Letters, vol. 86, No. 18, Apr. 30, 2001, 4013-4016.
White et al., Nonmaximally entangled states: production, characterization, and utilization, Physical Review Letters, vol. 83, No. 16, Oct. 18, 1999, 3103-3107.
Kwiat et al., Ultrabright source of polarization-entangled photons, Physical Review A, vol. 60, No. 2, Aug. 1999, 773-776.
Kwiat et al., Experimental entanglement distillation and "hidden" non-locality, Letter to Nature, 1014-1017, 2001.
Grover, Quantum computers can search arbitrarily large databases by a single query, Physical Review Letters vol. 79, No. 23, Dec. 8, 1997, 4709-4712.
Berthiaume et al., The quantum challenge to structural complexity theory, 132-137.
Ekert et al., Quantum computation and Shor's factoring algorithm, Reviews of Modern Physics, vol. 68, No. 3, Jul. 1996, 733-753.
Blum, Density matrix theory and applications, 1-217, 1981.
Zhang et al., Experimental and theoretical aspects of quantum teleportation, Center for Engineering Science Advanced Research, 9 pages.
Abouraddy et al., Degree of entanglement for two qubits, Physical Review A, vol. 64, 050101-1 to 050101-4.
Semat et al., Introduction to Atomic and Nuclear Physics, Fifth Edition, Chp. 7, Elements of quantum mechanics, 186-215.
Ekert, Quantum cryptography based on Bell's theorem, Physical Review Letters, vol. 67, No. 6, Aug. 5, 1991, 661-663.
Schenker, A quantum leap in codes for secure transmissions, International Herald Tribune, printed Apr. 12, 2004, {http://www.iht.com/articles/126822.html}, 3 pages.
Johnson, Magiq employs quantum technology for secure encryption, Advanced Technology, printed Apr. 12, 2004 {http://www.eetimes.com/at/news/OEG20021105S0019}, 3 pages.
McCulagh, Start-up makes quantum leap into cryptography, C/NET News.com, printed Apr. 12, 2004, {http://news.com.com/2100-1029-5103373.html}, 3 pages.
Scully et al., Two-photon scheme for detecting the Bell basis using atomic coherence, Physical Review Letters, vol. 83, No. 21, Nov. 22, 1999, 4433-4436.
Braunstein et al., Dense coding for continuous variables, Physical Review A, vol. 61, 042302-1 to 04302-4.
Santos et al., Measurement of the degree of polarization entanglement through position interference, Physical Review A, vol. 64, 023804-1 to 023804-6.
Saleh et al., Entangled-photon virtual-state spectroscopy, Physical Review Letters, vol. 80, No. 16, Apr. 20, 1998, 3483-3486.
Oberparleiter et al., Optics Communications, 183 (2000) 133-137.
Georgiades et al., Nonclassical excitation for atoms in a squeezed vacuum, Physical Review Letters, vol. 75, No. 19, Nov. 6, 1995, 3426-3429.
Joobeur et al., Spatiotemporal coherence properties of entangled light beams generated by parametric down-conversion, Physical Review A, vol. 50, No. 4, Oct. 1994, 3349-3361.
Nasr et al., Biphoton focusing for two-photon excitation, Physical Review A, vol. 65, 023816-1 to 023816-6.
Abouraddy et al., Role of entanglement in two-photon imaging, Physical Review Letters, vol. 87, No. 12, Sep. 17, 2001, 123602-1 to 123602-4.
Boeuf et al., Calculating characteristics of non-collinear phase-matching in uniaxial biaxial crystals, Optical Technology Division, pp. 1-24.
Abouraddy et al., Double-slit interference of biphotons generated in spontaneous parametric downconversion from a thick crystal, Journal of Optics B: Quantum and Semiclassical Optics 3, 2001, S50-S54.
Kwiat et al., Experimental verification of decoherence-free subspaces, Science, vol. 290, Oct. 20, 2000, 498-500.
Naik et al., Entangled state quantum cryptography: eavesdropping on the Eckert protocol, Physical Review Letters, vol. 84, No. 20, May 15, 2000, 4733-4736.
Yabushita et al., Spectroscopy by frequency entangled photon pairs, pp. 1-11(download date unknown), http://arxiv.org.

Perina et al., Multiphoton absorption cross section and virtual-state spectroscopy for the entangled $n$-photon state, Physical Review A, vol. 57, No. 5, May 1998, pp. 3972-3986.

Fei et al., Entangled-induced two-photon transparency, Physical Review Letters, vol. 78, No. 9, Mar. 3, 1997, pp. 1679-1682.

Yabushita et al., Spectroscopy by frequency entangled photon pairs, Physical Review A 69. 013806-1-013806-4 (2004).

Kurtsiefer et al., High-efficiency entangled photon pair collection in type-II parametric fluorescence, Physical Review A, vol. 64, 023802-1 to 023802-4.

Jost et al., Spatial correlations of spontaneously down-converted photon pairs detected with a single-photon-sensitive CCD camera, Optics Express, Jul. 20, 1998, vol. 3, No. 2, pp. 81-88.

Almeida et al., Transmission of quantum images through long distances, pp. 1-4, (download date unknown), http://arxiv.org.

Caetano et al., Quantum Physics, Abstract, Image formation by manipulation of the entangled angular spectrum, pp. 1-5, (download date unknown), http://arxiv.org.

Zavatta, Premio Italgas/Italgas Prize Energy and Environment 16th Edition, Summary of the Thesis "Debut in the World of Research".

Rubin et al., Theory of two-photon entanglement in type-II optical parametric down-conversion, Physical Review A, vol. 50, No. 6, Dec. 1994, pp. 5122-5133.

Waks et al., Security of quantum key distribution with entangled photons against individual attacks, Physical Review A, vol. 65, 052310-1 to 052310-16, 2002.

Ribeiro et al., Observation of image transfer and phase conjugation in stimulated down-conversion, pp. 1-6, (download date unknown), http://arxiv.org.

Caetano et al., Image-polarization entanglement in parametric down-conversion, 4 pages.

Ribeiro et al., Image and coherence transfer in the stimulated down-conversion process, pp. 1-5, (download date unknown), http://arxiv.org.

Caetano et al., Quantum distillation of position entanglement with the polarization degrees of freedom, ScienceDirect, Optics Communications, Mar. 3, 2004, (www.sciencedirect.com/science).

Law et al., Analysis and Interpretation of High Transverse Entanglement in Optical Parametric Down Conversion, Physical Review Letters, vol. 92, No. 12, Mar. 26, 2004.

O'Sullivan-Hale et al., Pixel Entanglement: Experimental Realization of Optically Entangled $d=3$ and $d=6$ Qudits, Physical Review Letters, vol. 92, No. 12, Jun. 10, 2005.

Shih, "Entangled Photons", IEEE Journal of Selected Topics in Quantum Electronics, vol. 9, No. 6, pp. 1455-1467, Nov./Dec. 2003.

* cited by examiner

ENTANGLED-PHOTONS RANGE FINDING SYSTEM AND METHOD

CROSS-REFERENCE TO RELATED APPLICATIONS

The present application claims priority to U.S. Utility patent application Ser. No. 10/850,394, to Kastella et al., entitled "System and Method of Detecting Entangled Photons," filed on May 21, 2004, and benefit of U.S. Provisional Patent Application No. 60/555,699, to Zaugg, entitled "Entangled-Photon Range Finding System and Method," filed on Mar. 24, 2004, the disclosures of which are expressly incorporated by reference herein in their entireties.

GOVERNMENT INTERESTS

To the extent that this invention was made with Government support under contract number NRO000-02-C-0371, awarded by the National Reconnaissance Office, the Government has certain rights in this invention.

BACKGROUND OF THE INVENTION

1. Field of the Invention

The invention relates to determining distances. In particular, the invention relates to using one photon of a pair of entangled photons, reflected off an object, to determine a distance to that object.

2. Discussion of Background Information

Mankind has been interested in determining distances to remote objects for centuries. Presently known techniques for determining ranges include RADAR and LIDAR, which rely on detecting emitted electromagnetic radiation.

Photons are quanta of electromagnetic energy. Multiple photons may be entangled or not entangled. Photons that are not entangled together (i.e., random photons) exist as independent entities. In contrast, entangled photons have a connection between their respective properties.

Two photons entangled together are referred to as an entangled-photon pair (also, "biphotons"). Traditionally, photons comprising an entangled-photon pair are called "signal" and "idler" photons. Measuring properties of one photon of an entangled-photon pair determines results of measurements of corresponding properties of the other photon, even if the two entangled photons are separated by a distance. As understood by those of ordinary skill in the art and by way of non-limiting example, the quantum mechanical state of an entangled-photon pair cannot be factored into a product of two individual quantum states.

In general, more than two photons may be entangled together. More than two photons entangled together are referred to as "multiply-entangled" photons. Measuring properties of one or more photons in a set of multiply-entangled photons restricts properties of the rest of the photons in the set. As understood by those of ordinary skill in the art and by way of non-limiting example, the quantum mechanical state of a set of n>2 multiply-entangled photons cannot be factored into a product of n separate states. The term "entangled photons" refers to both biphotons and multiply-entangled photons.

Photon properties that may be entangled include time, frequency, polarization, and angular momentum. In particular, photons that are entangled in time are referred to as "temporally-entangled photons." Such photons are generated nearly simultaneously. For given optical path lengths traveled by constituent photons in a temporally-entangled photon pair, detecting one of the photons places limits on the times at which the other photon may be detected. If the two temporally-entangled photons travel equal optical distances and the first photon is detected at time $t_0$, then the second may only be detected within $T_e$ of $t_0$, where $T_e$ is an entangled-photon parameter known as "entanglement time."

SUMMARY OF THE INVENTION

Known distance-determination techniques, such as RADAR and LIDAR, generally rely on transmitting certain types of electromagnetic radiation (e.g., relatively narrow band electromagnetic radiation, coherent electromagnetic radiation, pulsed electromagnetic radiation) that reflects off of an object in order to determine its distance from the RADAR or LIDAR unit. However, electromagnetic radiation as used by RADAR and LIDAR is easily detectable. Third party observers are therefore generally able to ascertain the existence and possibly location of operating RADAR and LIDAR systems. Thus, detectability by third parties remains a major drawback of using RADAR and LIDAR systems to measure distances for applications where stealth is desirable.

One aspect of the present invention provides a distance-determining system and method based on entangled photons that is substantially immune to detection by others.

According to an embodiment of the present invention, a system for and method of determining a distance to an object is disclosed. The method includes generating a first photon and a second photon, the first photon and the second photon being entangled. The first photon is directed at an object. The first photon is received after being reflected off of the object. The second photon is caused to travel a known distance. The first photon and the second photon are directed to an entangled photon sensitive material. An entangled-photon absorption of the first photon and the second photon is detected by the entangled photon sensitive material. A distance to the object is found based on at least the known distance and the detecting.

Various optional and preferable features of the above embodiment include the following. The second photon may be caused to travel a known distance by using a bank of delays. The first photon and the second photon may be directed to an optical cavity. The first photon and the second photon may be directed to a first cavity or a second cavity. An adjustable delay may be used.

According to another embodiment of the present invention, a system for and method of determining a distance to an object is disclosed. The method includes generating a first photon and a second photon simultaneously. The first photon is directed at an object. The first photon is received after being reflected off of the object. At least the second photon is caused to enter an optical cavity. An arrival of the first photon and an arrival of the second photon are detected. The detection is used to determine a distance to the object.

Various optional and preferable features of the above embodiment include the following. The detection may include detecting using electronic photon detectors. The detection may include detecting using an entangled photon sensitive material.

According to another embodiment of the present invention, a system for and method of finding a distance to an object is disclosed. The method includes generating a plurality of first photons and a plurality of second photons, each of the plurality of first photons being associated with one of the plurality of second photons. At least a first portion of the first photons is directed to the object. A reflected portion of the first photons is received after being reflected off the object. At least a second portion of the second photons is directed to a cavity. A correlation between at least some photons in the reflected portion and at least some photons in the second portion is detected. The correlation is used to determine the distance to the object.

Various optional and preferable features of the above embodiment include the following. The detecting may include detecting using a coincidence counter. The coincidence counter may detect a temporal correlation between arrival times, at a first detector, of at least some photons in the reflected portion and arrival times, at a second detector, of at least some photons in the second portion. The temporal correlation may include a temporal translation. The detection may include detecting using a biphoton sensitive material. The correlation may include spatial coincidence between the at least some photons in the reflected portion and the at least some photons in the second portion. The distance to the object may be found as a remainder of the distance to the object upon being divided by a length of the cavity. At least a third portion of the second photons may be directed to a second cavity. A second correlation between at least some photons in the reflected portion and at least some photons in the third portion may be detected. The correlation and the second correlation may be used to determine the distance to the object. At least a third portion of the photons in the second portion may be delayed. The method may include spectral filtering. A binary coil bank may be used.

According to another embodiment of the present invention, a system for and method of determining a distance to an object modulo a cavity length parameter is disclosed. The method includes generating a first photon and a second photon, the first photon and the second photon being entangled. The first photon is directed at an object. The first photon is received after being reflected off of the object. The second photon is caused to travel a known distance. At least the second photon is caused to enter an optical cavity. An arrival of the first photon and an arrival of the second photon are detected. A distance to the object modulo the cavity length parameter based on at least the known distance and the detection is found. The distance to the object modulo the cavity length parameter is used to determine the distance to the object.

Various optional and preferable features of the above embodiment include the following. The distance may be less than the cavity length parameter. The cavity length parameter may be the optical length of an optical cavity. The cavity length parameter may be a length associated with a plurality of optical cavities. The length associated with a plurality of optical cavities may be an effective cavity length.

According to another embodiment of the present invention, a system for and method of processing entangled photons is disclosed. The method includes selecting a wavelength. A cavity is configured to have a cavity length. The cavity has cavity mirror parameters. The cavity length and the selected wavelength have a ratio, which is divisible by π after being adjusted for the cavity mirror parameters. A plurality of photons are directed to the cavity. An entangled photon pair is detected, the entangled photon pair including a first photon and a second photon, the first photon having a first frequency and the second photon having a second frequency. The sum of the first frequency and the second frequency corresponds to the selected wavelength.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

The particulars shown herein are by way of example and for purposes of illustrative discussion of the exemplary embodiments of the present invention only and are presented in the cause of providing what is believed to be the most useful and readily understood description of the principles and conceptual aspects of the present invention. In this regard, the description taken with the drawings provides a fundamental understanding of the present invention, making apparent to those skilled in the art how the several forms of the present invention may be embodied in practice.

Figure 1:
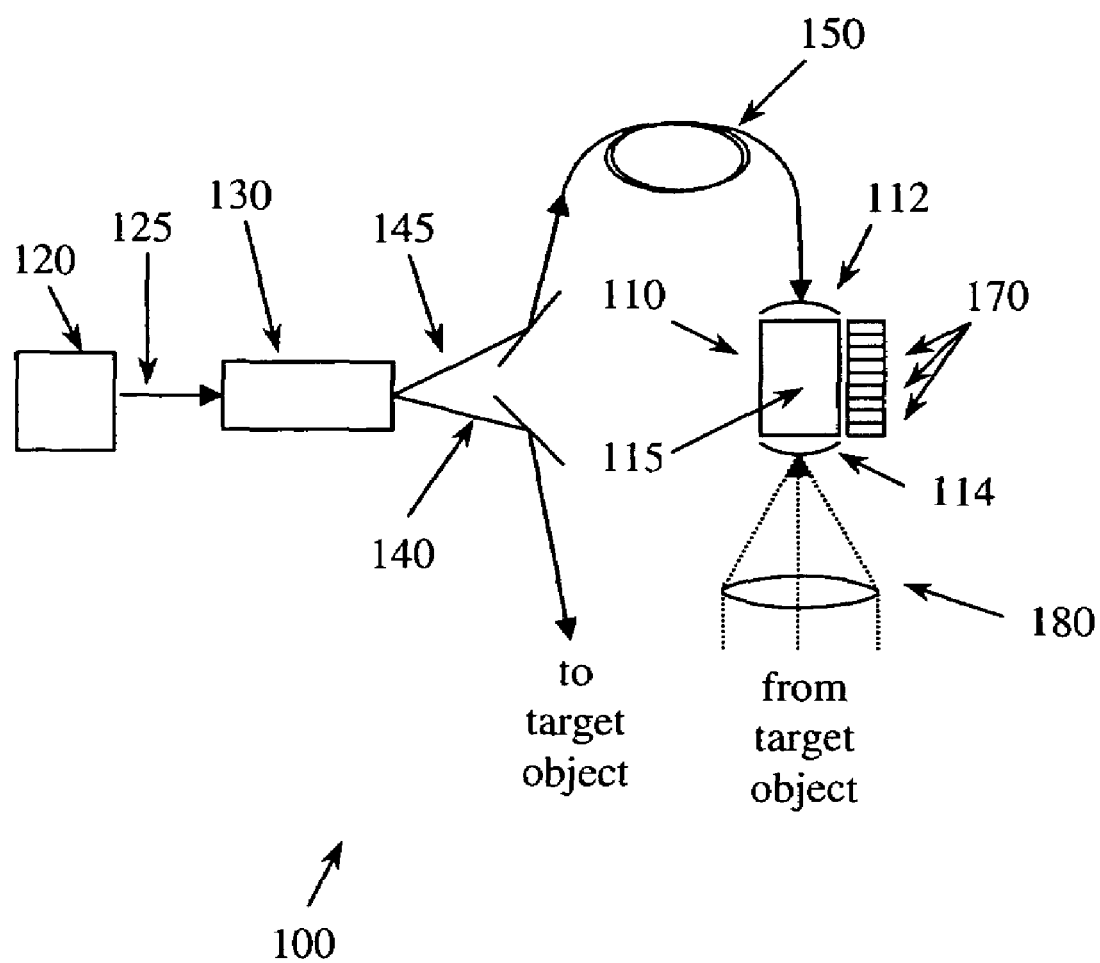
FIG. 1 is a schematic diagram depicting an entangled-photon range finder embodiment.

FIG. 1 depicts an embodiment of an entangled-photon range finder 100. Entangled-photon range finder 100 includes a coherent light source 120 (e.g., a laser), which provides pump beam 125. Pump beam 125 is directed to nonlinear crystal 130 (e.g., beta barium borate), which type-II parametrically down converts the photons of pump beam 125 into entangled-photon pairs that are separated (e.g., using a polarizing beam splitter, not shown) into signal photons 140 and idler photons 145.

Signal photons 140 are directed to the object whose range is to be determined (the "target object") using optical techniques known to those of ordinary skill in the art. The target object reflects back a portion of signal photons 140 to entangled-photon range finder 100. Assuming the target object scatters light in a diffuse manner, the probability $p_s$ that a photon scattered from the target object at range z returns to aperture 180 may be represented as, by way of non-limiting example, $p_s = A/(4\pi z^2)$, where A is the area of the aperture. Using optical techniques known to those of ordinary skill in the art, returning signal photons are gathered at aperture 180 and directed to optical cavity 110.

Idler photons 145 are directed to coiled polarization-preserving fiber 150. Fiber 150 sets the nominal range of the entangled-photon range finder embodiment. That is, fiber 150 delays idler photons 145 by an amount of time that corresponds to the estimated mean time it takes signal photons to arrive at, and return from, the target object. Preferably, the second photon of an entangled-photon pair to enter optical cavity 110 enters while the first photon of the pair to enter remains in optical cavity 110. Fiber 150 serves to ensure that signal photons 140 and idler photons 145 enter optical cavity 110 at approximately the same time by delaying entry of the idler photon to correspond with the delay resulting from the signal photon traveling to, and returning from, the target object. (Note, however, that either of reflected signal photons 140 or delayed idler photons 145 may be the first to enter optical cavity 110.) The nominal range of the entangled-photon range-finder is thus determined as the distance that corresponds to one-half of the delay introduced by fiber 150. From fiber 150, idler photons 145 are directed to optical cavity 110 such that they counter-propagate (i.e., enter at an opposite end of optical cavity 110) with respect to signal photons 140.

Optical cavity 110 is configured to temporarily trap entering signal photons 140 and idler photons 145 by continuously reflecting them back-and-forth inside the cavity. Optical cavity 110 has high-quality mirrors 112, 114 (e.g., at least 99% reflectance). Preferably, mirrors 112, 114 are concave with foci set to ensure that photons remain inside optical cavity 110. A photon's probability of remaining inside optical cavity 110 drops to about 1/e after it is reflected back and forth inside optical cavity 110 approximately $1/(T_1+T_2)$ times, where $T_1$, $T_2$ are the transmittance of mirrors 112, 114, respectively. Thus, a photon's lifetime inside optical cavity 110 is approximately $2L_c/c(T_1+T_2)$, where $L_c$ is the length of optical cavity 110. A typical photon's lifetime in an optical cavity is, by way of non-limiting example, on the order of $10^{-8}$ seconds for mirrors with a 1% transmittance.

Optical cavity 110 contains biphoton sensitive material ("BSM") 115. BSM 115 absorbs entangled-photon pairs with a high probability and allows single photons and random photon pairs to pass through with very low probability of being absorbed. BSM 115 is therefore essentially transparent to all photons except biphotons. Generally, both photons of an entangled-photon pair must be incident on the same atom or molecule of BSM 115 within the entanglement time in order to be absorbed. After absorbing an entangled-photon pair, an atom or molecule of BSM 115 ejects a fluorophoton, which may be detected to indicate an entangled-photon pair absorption. One or more suitable detectors in conjunction with BSM 115 thus detect a correlation between signal photons 140 and the idler photons 145 with which they are entangled. A detailed description of BSM 115 is found in U.S. Utility patent application Ser. No. 10/850,394, U.S. Patent Publication No. 2005/006953, entitled "System and Method of Detecting Entangled Photons," to Kastella et al., filed on May 21, 2004. BSM 115 may be, by way of non-limiting example, rubidium-87.

Detectors 170 are configured to detect evidence of entangled-photon pair absorption by BSM 115 within optical cavity 110. More particularly, optical cavity 110 is partitioned along its length $L_c$ into M resolution cells each of width $\Delta$ and each equipped with an individual detector configured to monitor indicia of entangled-photon absorption in that resolution cell. Thus, $M\Delta = L_c$. An individual detector 170 registering an entangled-photon absorption at its associated resolution cell indicates the location at which the signal photon has traveled essentially the same distance as the idler photon. Thus, registering an entangled-photon absorption provides an indication of distance to the target object. Each detector is functionally connected to a computer, which processes detection information as described herein.

The distance to the target object is resolved up to an integer number of cavity lengths $L_c$ (i.e., modulo the cavity length) according to the following. A signal photon returning from the target object and its corresponding idler photon will first be present in the same detector region according to, by way of non-limiting example:

$$2d_o + \left(j - \frac{1}{2}\right)\Delta = d_{sys} + 2nL_c + \left(M - j + \frac{1}{2}\right)\Delta. \quad (1)$$

In equation (1), j represents the detector region in which both signal and idler photons are first present together, where the detectors are enumerated such that the first detector is adjacent to aperture 180. The symbol $d_o$ represents the distance to the target object. The symbol $d_{sys}$ represents the idler photon optical path length prior to entering optical cavity 110, and includes, inter alia, the length of fiber 150. The letter n represents the number of complete round trips made by the idler photon in optical cavity 110. The symbol $\Delta$ represents the width of each resolution cell. By way of non-limiting illustrative example, assume for the purposes of exposition that the signal photon enters optical cavity 110 first. In equation (1), $d_{sys}$, $\Delta$, M, and $L_c$, are known system parameters. The quantity j may be determined by monitoring detectors 170. Equation (1) accordingly determines the distance $d_o$ of the target object except for an unknown number n of signal photon round-trips in the cavity. Thus, the distance $d_o$ to the target object may be resolved modulo the cavity length to an accuracy of $\Delta$ by monitoring detectors 170 to determine j, plugging in known system parameters, and solving equation (1) for $d_o$ in terms of n. This computation thus determines $d_0$ mod $L_c$, where the notation "a mod b" in general indicates the remainder left over after dividing a by b.

When monitoring detectors 170, two resolution cells are likely to indicate biphoton absorptions. These two locations arise due to the fact that, in addition to being present together in resolution cell j, signal photons 140 and corresponding idler photons 145 will also be present together in the same resolution cell at a conjugate location j'. More particularly, the signal photons 140 reflected from the target object will encounter their corresponding idler photons 145 at resolution cell j' according to, by way of non-limiting example:

$$2d_o + L_c + \left(M - j' + \frac{1}{2}\right)\Delta = d_{sys} + (2n+1)L_c + \left(j' - \frac{1}{2}\right)\Delta. \quad (2)$$

The parameters here are the same as those for equation (1) except that in equation (2), j' indicates the conjugate resolution cell in which the biphoton's constituent photons are present. Generally, j' will be at a mirror-image position to j, where the term "mirror-image" is used here to describe the apparent location of a reflection that would appear if a mirror were inserted at the half-way point $L_c/2$ in optical cavity 110. Once both photons of an entangled pair are injected into optical cavity 110, they will continue to counter-propagate and be present together in resolution cells j and j' throughout their lifetimes in optical cavity 110.

The ambiguity between which detector 170 detects the true first location j at which the signal and corresponding idler photons are present together and which detector detects its conjugate j' may be resolved, by way of non-limiting example, as follows. Mechanically or electro-optically adjusting the path length $d_{sys}$ will cause j and j' to change. Techniques for adjusting optical path length are discussed in detail below in reference to FIG. 5. If $d_{sys}$ is lengthened, j will increase and j' will decrease. Similarly, if $d_{sys}$ is shortened, j will decrease and j' will increase. Thus, by perturbing the path length and monitoring detectors 170 for the positions of j and j', the true resolution cell of first coincidence j will be identified. Other techniques for differentiating j and j' may also be used.

Both photons of an entangled-photon pair preferably enter optical cavity 110 before the first photon of the pair to enter is either absorbed or exits optical cavity 110. The depth of field (i.e., the distance about the nominal range in which ranges may be determined) is accordingly a function of the cavity lifetime of the first photon to enter optical cavity 110. Thus, the photon lifetime inside of optical cavity 110 is one parameter that affects the ranges that may be measured by an entangled-photon range finder embodiment. A target object that is within the depth of field of the nominal range will generally have its distance accurately determined. The depth of field for the entangled-photon range finder embodiment, centered about its nominal range (as determined in part by the length of fiber 150), may be approximated as, by way of non-limiting example:

$$Z_{ph} = \frac{L_c}{1-R}. \quad (3)$$

In equation (3), $Z_{ph}$ is the depth of field, $L_c$ is the length of optical cavity 110, and R is the reflectance of mirrors 112, 114. Outside of one depth of field from the nominal range, the biphoton coincidence amplitude decays to 1/e of its nominal value.

Depth of field may be used to avoid certain types of inaccurate range determinations. By way of non-limiting example, near-field clutter may produce aberrant range determinations by reflecting signal photons before they reach the target object. Such aberrations may be avoided by insuring that signal photons returning from such near-field objects do not survive in the cavity long enough to coincide with their idler photons. Conversely, a background to the target object, such as clouds or the Earth's surface, may reflect signal photons and produce aberrant range determinations. Such determination may be avoided by insuring that the idler photons do not last inside of the cavity long enough to coincide with signal photons returning from far beyond the target object. In both instances described in this paragraph, configuring the depth of field to insure that in some cases the signal and idler photons do not coincide avoids certain aberrant range determinations.

Figure 2:
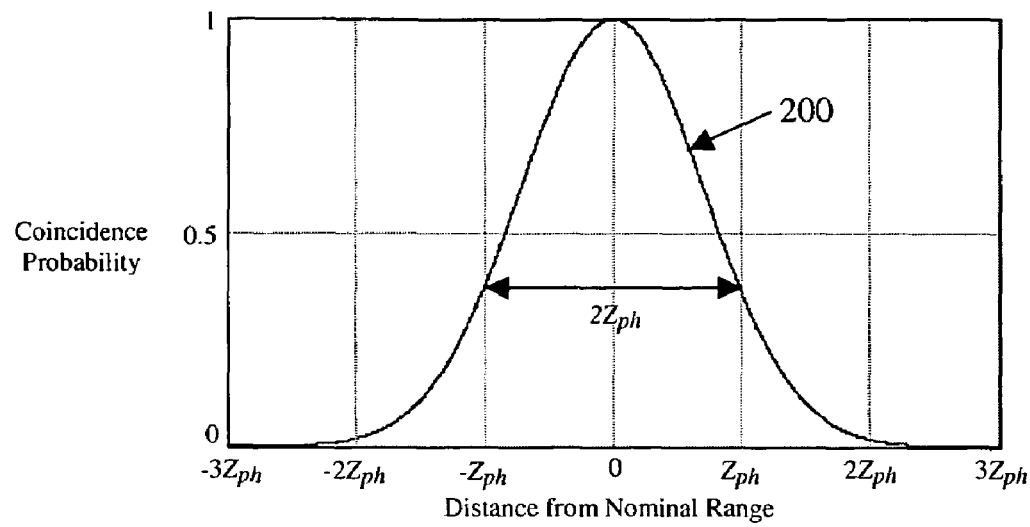
FIG. 2 is a graph showing coincidence probability relative to distance from nominal range according to an embodiment of the present invention.

FIG. 2 is a graph depicting coincidence probability relative to target object distance from nominal range according to an embodiment of the present invention. The nominal range is discussed above in reference to equation (3). If the target object is within the depth of field of the nominal range (within the nominal range $\pm Z_{ph}$) then the probability of coincidence is at its highest. If the target object's distance from the nominal range is greater than the depth of field (outside of the nominal range $\pm Z_{ph}$) then the probability of coincidence falls off dramatically. At twice the distance of the depth of field (more than $\pm 2Z_{ph}$) from the nominal range, the probability of coincidence is statistically insignificant.

Figure 3:
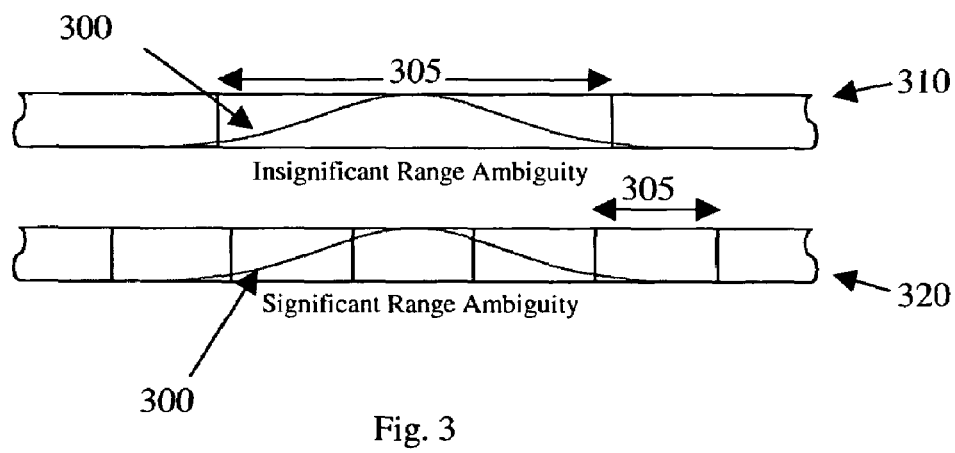
FIG. 3 is a schematic diagram depicting range ambiguity for two different cavity lengths according to various embodiments of the present invention.

FIG. 3 depicts the effects on range finding of photon lifetime relative to differing cavity lengths 305 according to various embodiments of the present invention. If the depth of field is greater than the cavity length 305 as depicted at 320, the resulting significant range ambiguity will inhibit uniquely resolving the underlying range. This ambiguity results in an initial range determination that is plus or minus some integer multiple of the cavity length of the actual range. This is seen by noting that the curve 200 of FIG. 2 (scaled downward in the y-axis direction) interposed at 300 as depicted at 320 covers multiple cavity lengths. Conversely, when the cavity length 305 is greater than the depth of field as depicted at 310, the range ambiguity becomes insignificant, allowing for the range to be fully and uniquely resolved. The curve 200 of FIG. 2 (scaled downward in the y-axis direction and depicted 300 at 310) thus essentially fits within a single cavity length. The use of larger cavity lengths (through, e.g., multiple cavities as discussed below in reference to FIGS. 8-10) can reduce the possibility of ambiguity and increase the likelihood of accurately measuring the range to target by increasing the effective cavity length to beyond the depth of field. Alternately, or in addition, such an ambiguity may be accounted for and the actual range determined by any, or a combination of, modifying the nominal range, by computer processing (e.g., looking for a sudden discontinuity in ranging that is some multiple of the cavity length), or by other methods.

Figure 4:
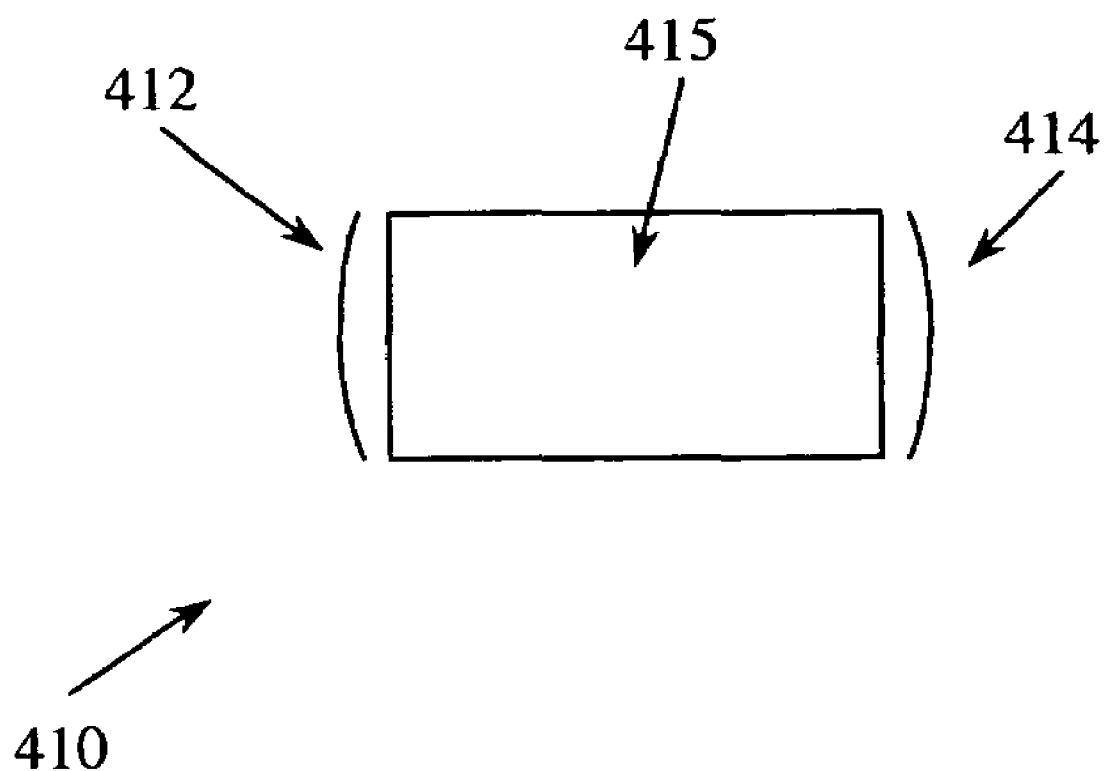
FIG. 4 is a schematic diagram depicting an optical cavity according to an embodiment of the present invention.

FIG. 4 is a schematic diagram of an optical cavity 410 according to an embodiment of the present invention. The length of optical cavity 410 is selected to, inter alia, ensure a biphoton resonance condition. As described in reference to equations (4)-(14) below, the biphoton resonance condition maximizes the two-photon coincidence amplitude. As shown in Morton H. Rubin, David N. Klyshko, Y. H. Shih and A. V. Sergienko, *Theory of two-photon entanglement in type-II optical parametric downconversion*, 50 Phys. Rev. 6, at 5122 (December 1994), biphoton coincidence amplitude satisfies, by way of non-limiting example:

$$R_c \propto \langle \psi | E_1^{(-)} E_2^{(-)} E_2^{(+)} E_1^{(+)} | \psi \rangle = |\langle 0 | E_2^{(+)} E_1^{(+)} | \psi \rangle|^2 = |A(t_1,t_2)|^2. \quad (4)$$

In equation (4), $t_i = T_i - s_i/c$ for i=1,2 where $T_1$ is the time at which the signal photon is absorbed or detected, $T_2$ is the time at which the idler photon is absorbed or detected, $s_1$ is the total optical path length traveled by the signal photon, and $s_2$ is the total optical path length traveled by the idler photon. The symbol $R_c$ represents the average coincidence count rate, and the symbol $|\psi\rangle$ represents the biphoton wave function at the output surface of the crystal. For i=1,2, $E_i^{(+)}$ is the quantum field operator evaluated at time $T_i$ at the location of absorption or detection for the signal photon (i=1) and idler photon (i=2), respectively. The symbol $E_i^{(-)}$ is the Hermitian conjugate of $E_i^{(+)}$ for i=1,2.

Toward calculating a biphoton resonance condition, biphoton coincidence amplitude A in the absence of an optical cavity can be written as, by way of non-limiting example:

$$A(t_1, t_2) = \eta_0 e^{i\frac{\omega_p}{2}(t_1+t_2)} e^{-i\frac{\omega_d}{2}(t_1+t_2)} \prod(t_1 - t_2). \quad (5)$$

The parameters of equation (5) are the same as those of equation (4) with the following additions: $\eta_0$ is a normalization constant, $\omega_p$ is the frequency of pump beam (e.g., 125 of FIG. 1), and $\omega_d$ is the difference between signal photon and idler photon frequencies. The symbol $\Pi(t)$ in equation (5) represents the rectangle function:

$$\prod(t) = \begin{cases} \frac{1}{DL}, & DL > t > 0 \\ 0, & \text{otherwise} \end{cases} \quad (6)$$

In the rectangle function of equation (6), D is the difference in inverse group velocities of ordinary and extraordinary rays leaving a nonlinear crystal. By way of non-limiting example, for beta barium borate, $D \approx 0.2$ psec/mm, where "psec" denotes picoseconds. L is the length of the nonlinear crystal. The product DL determines the entanglement time. The incorporation of the rectangle function defined by equation (5) into equation (4) serves to indicate that if an idler photon is absorbed or detected at time $T_2$, then, for equal optical path lengths $s_1 = s_2$, the probability that the signal photon is detected at time $T_1$ is effectively zero for $T_1 < T_2$ or for $T_1 > T_2 + DL$. The probability amplitude also satisfies the following equation:

$$\int_{t_2}^{t_2+DL} |A(t_1, t_2)|^2 \, dt_1 = 1. \quad (7)$$

Equation (7) implies the following equation:

$$\eta_0^2 = DL. \quad (8)$$

The biphoton probability amplitude inside of optical cavity 410 is calculated presently. By way of exposition and non-limiting example, the signal and idler photons are assumed to enter the cavity from the same side with equal optical path lengths and with no attenuation. Optical cavity 410 is characterized by the complex reflectance coefficients $r_1, r_2$ and transmittance coefficients $g_1, g_2$ of the two mirrors 412, 414, respectively. When a biphoton encounters a mirror, a portion of each component photon's amplitude is transmitted and a portion is reflected. Thus, with each round trip through optical cavity 410, biphoton amplitude inside optical cavity 410 is reduced. The total biphoton amplitude at position x inside optical cavity 410 can be written as, by way of non-limiting example:

$$A_{cav}(t_1, t_2, x) = \quad (9)$$
$$\sum_{n=0}^{\infty} \sum_{m=0}^{\infty} g_1 g_2 (r_1 r_2)^{n+m} A\left(t_1 - \frac{2nL_c + x}{c}, t_2 - \frac{2mL_c + x}{c}\right)$$

in terms of the biphoton amplitude A in the absence of a cavity. By way of non-limiting example, denote by $\tau$ the delay induced by lengthening the optical path of signal photons relative to the optical path length of idler photons. Equivalent calculations may be performed in the case where idler photons are delayed. With a delay of $\tau$, the biphoton amplitude, $A_{cav}(t-\tau, t, x)$, is generally zero unless, by way of non-limiting example:

$$n + \frac{c\tau}{2L_c} < m < n + \frac{c(\tau + DL)}{2L_c}. \quad (10)$$

When the delay $\tau$ corresponds to an integral number of round trip lengths, (i.e., $c\tau = 2pL_c$ for some integer p), the biphoton amplitude becomes, by way of non-limiting example:

$$A_{cav}(t-\tau, t, x) = \eta_0 e^{-2i\frac{\omega_p}{c}x} e^{i\frac{\omega_p}{2}(2t-\tau)} e^{-i\frac{\omega_d}{2}\tau} \frac{g_1 g_2}{DL}(r_1 r_2)^p \quad (11)$$
$$\sum_{n=0}^{\infty} (r_1 r_2)^{2n} e^{-i\omega_p\left(\frac{2nL_c}{c}\right)}$$
$$= \eta_0 e^{-2i\frac{\omega_p}{c}x} e^{i\frac{\omega_p}{2}(2t-\tau)} e^{-i\frac{\omega_d}{2}\tau} e^{i(\varphi_1 + \varphi_2 + p(\phi_1 + \phi_2))}$$
$$\frac{\sqrt{G_1 G_2}}{DL}(R_1 R_2)^{\frac{p}{2}} \frac{1}{1 - R_1 R_2 e^{-i\left(\frac{\omega_p}{c} 2L_c - 2\phi_1 - 2\phi_2\right)}}.$$

In equation (11), $\phi_i$ and $\varphi_i$ are the phases of the complex reflection coefficient and transmission coefficient, respectively, for i=1, 2. The exponent in the denominator of equation (11) affects biphoton resonance in optical cavity 410 as described immediately below in reference to equation (12).

The probability of biphoton coincidence is maximized by selecting a cavity length $L_c$ that satisfies the biphoton resonance condition, which may be represented as, by way of non-limiting example:

$$\frac{\omega_p}{c}L_c - \phi_1 - \phi_2 = q\pi. \quad (12)$$

In equation (12), q may be any integer. The wavelength of a biphoton may be characterized as the speed of light divided by the sum of the signal photon frequency and idler photon frequency. For a particular optical cavity and a particular biphoton wavelength, the biphoton resonance condition obtains when the left-hand-side of equation (12), represented by radians, is divisible by $\pi$. The left-hand-side of equation (12) represents the cavity length divided by the biphoton wavelength and adjusted for the phases of the complex reflection coefficients for the cavity mirrors. Note that the frequencies of the individual photons in an entangled photon pair do not affect the biphoton resonance condition. Under the biphoton resonance condition and for identical lossless mirrors (i.e., $r_1 = r_2 = R$ and $g_1 = g_2 = G = 1-R$), the probability of biphoton coincidence may be described as, by way of non-limiting example:

$$|A_{cav}(t_1, t_2, x)|^2 = \quad (13)$$
$$\eta_0^2 R^{nint\left(\frac{c\tau}{2L_c}\right)} \frac{(1-R)}{(1+R)^2} \prod^2\left(t_1 - t_2 - \left[\tau - \frac{2L_c}{c} nint\left(\frac{c\tau}{2L_c}\right)\right]\right).$$

The presence of the rectangle function Π in equation (13) indicates that the biphoton coincidence probability has a peak for every τa multiple of $2L_c/c$. Compared to the biphoton probability in the absence of the cavity, we see that the first peak (τ=0) has been reduced by a factor of, by way of non-limiting example:

$$\frac{|A_{cav}(t_1, t_2, x)|^2}{|A(t_1, t_2)|^2} = \frac{(1-R)}{(1+R)^2} \quad (14)$$

with each successive peak reduced by an additional $R^2$.

One consequence of the biphoton resonance condition is that the only biphotons to emerge from optical cavity 410 with a relatively high coincidence probability will be those originating from photons of a particular frequency. Note that when the biphoton resonance condition is not met, the biphoton probability amplitude becomes very small relative to when the condition is met. If the frequency of the signal photons is changed (e.g., by the Doppler effect due to relative motion between the range finder and target object), the cavity or pump frequency should be adjusted to account for the change. The biphoton resonance condition can then be used to filter for a particular Doppler frequency in systems where relative motion is great enough to affect results. Relative motion between the range finder and target object may be accounted for in other ways, such as by limiting the integration time, or by sweeping an adjustable delay or coincidence delay $\tau_w$.

The presence of optical cavity 410 in an entangled photon range finder embodiment (e.g., optical cavity 110 in the range finder embodiment of FIG. 1) has several advantages. In order for a BSM to detect a biphoton, both the signal photon and the idler photon should be present together at the same BSM molecule within the entanglement time. Without a cavity, this could be accomplished by delaying the idler photon (e.g., using fiber 150) to precisely match the time it takes its corresponding signal photon to propagate to and be reflected from the target object. However, with optical cavity 410, the delay imposed upon the idler photon need not be exactly equal to the signal photon delay because the signal and idler photons will have the opportunity to encounter each-other numerous times within optical cavity 410. Optical cavity 410 serves to fold the optical path that a photon takes back onto itself a large number of times, and the signal and idler photons have an opportunity to encounter each-other with each such fold.

Figure 5:
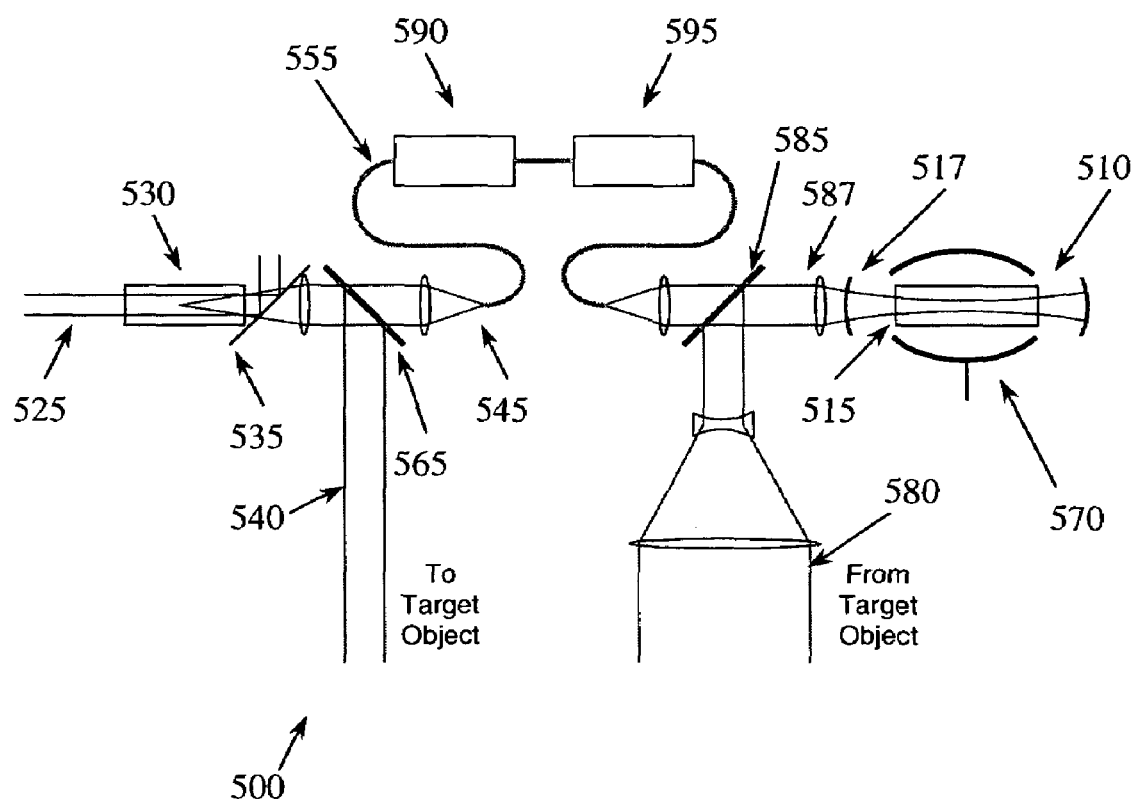
FIG. 5 is a schematic diagram depicting an entangled-photon range finder embodiment.

FIG. 5 depicts an embodiment of an entangled-photon range finder 500 in which signal photons 540 and idler photons 545 propagate in the same direction in optical cavity 510 (i.e., the signal and idler photons enter from the same side). Pump beam 525 is directed to nonlinear crystal 530, which causes pump beam photons 525 to split into entangled-photon pairs. FIG. 5 also depicts a dichroic beam splitter 535, which is placed so as to prevent any residual pump beam 525 leaving nonlinear crystal 530 from passing. Entangled-photon pairs are directed to polarizing beam splitter 565, which separates signal photons 540 from idler photons 545. Signal photons 540 are directed to the target object and collected at aperture 580 upon being reflected. Idler photons are directed to delay coil bank 590 and then to adjustable delay 595. Idler photons 545 leaving adjustable delay 595 and signal photons 540 returning from the target object are passed into a combined beam 587 using polarizing beam splitter 585. Combined beam 587 is directed to optical cavity 510. Optical cavity 510 containing BSM 515 is monitored by detector 570. Because signal photons 540 and idler photons 545 propagate in the same direction, their absorption by BSM 515 may be detected throughout optical cavity 510 by detector 570. Detector 570 may include, by way of non-limiting example, an avalanche photodiode or a photo multiplier tube.

Binary coil bank 590 is used to set the idler photon optical path to about the same length as twice the estimated distance to the target object. Binary coil bank 590 thus sets the nominal range of the entangled-photon range detector. In particular, each signal photon (e.g., 140) and the idler photon (e.g., 145) with which it is entangled preferably enters optical cavity 510 within the optical cavity lifetime of the first to enter. Further detail of binary coil bank 590 are presented below in reference to FIG. 6.

Adjustable delay 595 is set to produce maximal biphoton absorptions within the time interval from zero to $2L_c/c$. Maximal biphoton absorption coincides with each signal photon 540 entering optical cavity 510 or being reflected off mirror 517 within the entanglement time interval of the idler photon 545 with which it is entangled entering optical cavity 510 or being reflected off mirror 517. Maximal biphoton absorption also indicates that the total optical path length traveled by idler photons 545 equals the total optical path length traveled by signal photons 540. The time adjustment, τ, from adjustable delay 595 can be resolved to within a fraction of the entanglement time. The entanglement length (the entanglement time multiplied by the speed of light) is analogous to resolution cell width Δ for this arrangement. If the length $L_c$ of optical cavity 510 is chosen to be a multiple M of the entanglement length, then maximal biphoton absorption will occur when τ lies in the j-th temporal interval of width Δ/c, where, by way of non-limiting example:

$$j = nint\left[\frac{c(2L_c/c - \tau)}{2\Delta} + \frac{1}{2}\right]. \quad (15)$$

Because the entanglement length is short, the partial range resolution can be on the order of 60 μm, resulting in a large number of effective resolution cells for a relatively short cavity length. With each round-trip inside optical cavity 510, a photon accrues an additional $2L_c$ path length. Therefore, maximal biphoton absorptions may be achieved by selecting r from between zero and $2L_c/c$. That is, to determine a setting of adjustable delay 595 that maximizes biphoton absorption, it suffices to test values of τ in the closed interval [0, $2L_c/c$]. Use of optical cavity 510 thus provides a concise search domain within which delay times may be selected to correlate the signal and idler photons. Optical cavity 510 effectively limits the delay values that need to be tested to achieve maximal biphoton absorption. Further details of adjustable delay 595 are disclosed below in reference to FIG. 7.

The distance to the target object resolved up to an unknown multiple of $L_c$ once biphoton absorptions are maximized as follows. The distance $d_{sys}$ traveled by idler photons 545 is known. Because $d_{sys}+2nL_c$ is within the entanglement distance (the distance that light can travel during the entanglement time) of $d_0$, the distance $d_0$ to the target object may be determined modulo the cavity length by monitoring system parameters and computing, by way of non-limiting example:

$$d_{sys}/2 \bmod L_c. \quad (16)$$

In equation (16), the quantity $L_c$ is the length of cavity 510, and $d_{sys}$ is the system path length traveled by idler photons 545, including the delays introduced by binary coil bank 590 and adjustable delay 595 but not including the unknown number n of round trips in optical cavity 510. The resulting number $d_{sys}/2$ mod $L_c$ is within the entanglement length of $d_0$ mod $L_c$ once internal system path lengths are accounted for. Because entanglement times on the order of picoseconds are possible, margins of error of less than one millimeter are contemplated.

The signal-to-noise ratio for the embodiment of FIG. 5 is estimated presently. The rate at which photons are detected has two contributions, one from the biphotons and one from random two-photon absorption. The contribution from the biphotons may be represented as, by way of non-limiting example:

$$\Phi_{det\_bi} \approx \eta L_I \rho \Phi_{bi} \left( \frac{\dot{\rho}_{ee}^{(entangled)} \hbar^2 \omega_p^2}{2 A_e T_c c^2 \varepsilon_0^2 \mathcal{E}_{\omega_p}^4} \right) \frac{R^{nint\left(\frac{c\tau}{2L_c}\right)}}{(1+R)^2}. \tag{17}$$

In equation (17), $\Phi_{bi}$ is the flux of biphotons and $L_I$ is the length of the interaction region within the cavity. The symbol $\rho_{ee}$ is the density matrix element for a BSM atom absorbing a photon pair, and the 'dot' represents a derivative with respect to time. The symbol R represents the reflectivity of the cavity mirrors, which are assumed to be lossless for purposes of exposition. The symbol $\omega_p$ represents the pump beam frequency. The symbol $E_{\omega_p}$ represents the electric field per photon of frequency $\omega_p$. The symbol $A_e$ represents the entanglement area and $T_e$ represents the entanglement time. The symbol $\eta$ represents the probability that a molecule excited via two-photon absorption emits a fluorophoton that is detected by the photo-detecting elements (i.e., the quantum efficiency).

The random two-photon absorption contribution to the detection rate may be represented as, by way of non-limiting example:

$$\Phi_{det\_bg} \approx \eta \Phi_s \Phi_i \left( \frac{\rho_{ee}^{(unentangled)} \hbar^2 \omega_p^2}{c^2 \varepsilon_0^2 \mathcal{E}_{\omega_p}^4} \right) \frac{L_I \rho}{\pi w^2} \frac{R^{nint\left(\frac{c\tau}{2L_c}\right)}}{(1+R)^2}. \tag{18}$$

The symbols in equation (18) have the same meaning as those of equation (17), except w represents the radius for the signal photon and idler photon beams, $\Phi_s$ represents the signal photon flux, and $\Phi_i$ represents the idler photon flux. For zero detuning between the pump frequency and the two-photon transition (see U.S. Utility patent application Ser. No. 10/850,394), factoring the random two-photon detection rate from the total detection rate yields a total detection rate of, by way of non-limiting example:

$$\Phi_{det} \approx \eta \frac{\dot{\rho}_{ee}^{(unentangled)} \hbar^2 \omega_p^2}{c^2 \varepsilon_0^2 \mathcal{E}_{\omega_p}^4} L_I \rho \left[ \Phi_{bi} \frac{\Omega}{A_e T_e \gamma \sqrt{\pi}} + \frac{1}{\Phi_s \Phi_i \frac{1}{\pi w^2}} \right] \frac{R^{nint\left(\frac{c\tau}{2L_c}\right)}}{(1+R)^2}. \tag{19}$$

The symbols of equation (19) have the same meaning as those of equation (18), except $\Omega$ represents the bandwidth of the signal photon and idler photon beams, and $\gamma$ represents the line width of the excited atomic state, that is, the width of the transition. The signal-to-noise ratio for the embodiment of FIG. 5 may accordingly be approximated as, by way of non-limiting example:

$$SNR \approx \frac{\sqrt{\eta \left( \frac{L_I \rho \dot{\rho}_{ee}^{(unentangled)} \hbar^2 \omega_p^2}{c^2 \varepsilon_0^2 \mathcal{E}_{\omega_p}^4} \right) \frac{\Omega}{A_e T_e \gamma \sqrt{\pi}}}}{\sqrt{8B \left[ \frac{1}{\Phi_{bi}} + \frac{\Phi_s \Phi_i}{\Phi_{bi}^2} \frac{A_e T_e \gamma \sqrt{\pi}}{\Omega \pi w^2} \right]}}. \tag{20}$$

The symbols of equation (20) are the same as those of equation (19), except that B represents the electronics bandwidth. The electronics bandwidth B is the reciprocal of the integration time, where the "integration time" is the amount of time spent testing each particular adjustable delay setting. In typical ranging applications where some signal photons do not return to the range finder, the biphoton flux is equal to the signal flux, which differs from the idler flux by $p_s$, the probability that a signal photon returns from the target object. Background-limited signal-to-noise is achieved when, by way of non-limiting example:

$$\Phi_i \gg \frac{\Omega \sqrt{\pi} w^2}{A_e T_e \gamma}. \tag{21}$$

The symbols of equation (21) are the same as those of equation (20). When equation (21) obtains, the background-limited signal-to-noise ratio may be represented as, by way of non-limiting example:

$$SNR = \frac{w}{A_e T_e} \frac{\Omega}{\gamma} \sqrt{\frac{\eta P_s L_i \rho}{8B}} \sqrt{\frac{\dot{\rho}_{ee}^{(unentangled)} \hbar^2 \omega_p^2}{c^2 \varepsilon_0^2 \mathcal{E}_{\omega_p}^4}} = \frac{w \sigma}{A_e T_e} \frac{\Omega}{\gamma} \sqrt{\frac{\eta P_s L_i \rho \tau}{8B}} \tag{22}$$

In equation (22), $\sigma$ is the single photon absorption cross-section and $\tau$ is the lifetime of the virtual state. The other symbols of equation (22) are the same as those of equation (20). To improve the signal-to-noise ratio for BSM embodiments, a filter may be interposed before the optical cavity in order to prevent photons that are not of the appropriate frequencies from entering.

Figure 6:
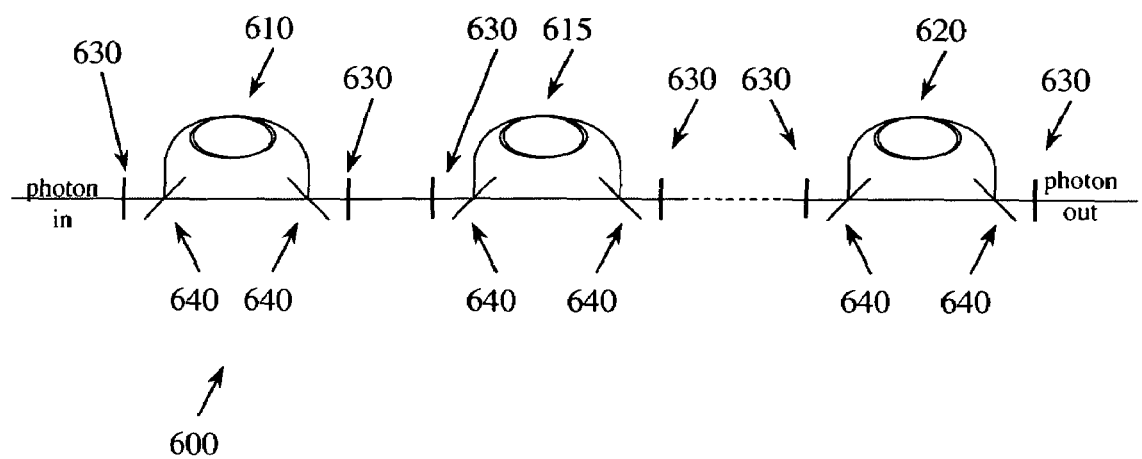
FIG. 6 is a schematic diagram depicting a delay coil bank according to an embodiment of the present invention.

FIG. 6 depicts a delay coil bank 600 according to an embodiment of the present invention. Delay coil bank 600 is used to set the nominal range (or center of the depth of view) of an entangled-photon range finder. Each coil 610, 615, 620 is preferably polarization-preserving and may be independently switched into or out of the photon path. Switching may be performed, by way of non-limiting example, by electro-optical elements 630, which act as half-wave plates when activated, and pairs of polarizing beam splitters 640. When electro-optical elements 630 are not activated, photons travel through polarizing beam splitters 640. Conversely, when electro-optical elements are activated, photon polarization is rotated by 90° and photons are reflected off of polarizing beam splitters 640. Thus, when electro-optical elements are activated for a particular coil, e.g., 610, photons are diverted through that coil and subsequently returned to the photon path. Each coil length is a power-of-two multiple of some length increment, which is preferably no greater than the depth of field (equation (3)). The nominal range as set by delay coil bank 600 may be represented as, by way of non-limiting example:

$$2\rho_0 = z_0 \sum_{n=0}^{N} b_n 2^n. \qquad (23)$$

In equation (23), $\rho_0$ is the nominal range and $z_0$ is the minimal coil length. The term $b_n$ is one if the n-th coil is switched into the path and zero otherwise.

Figure 7:
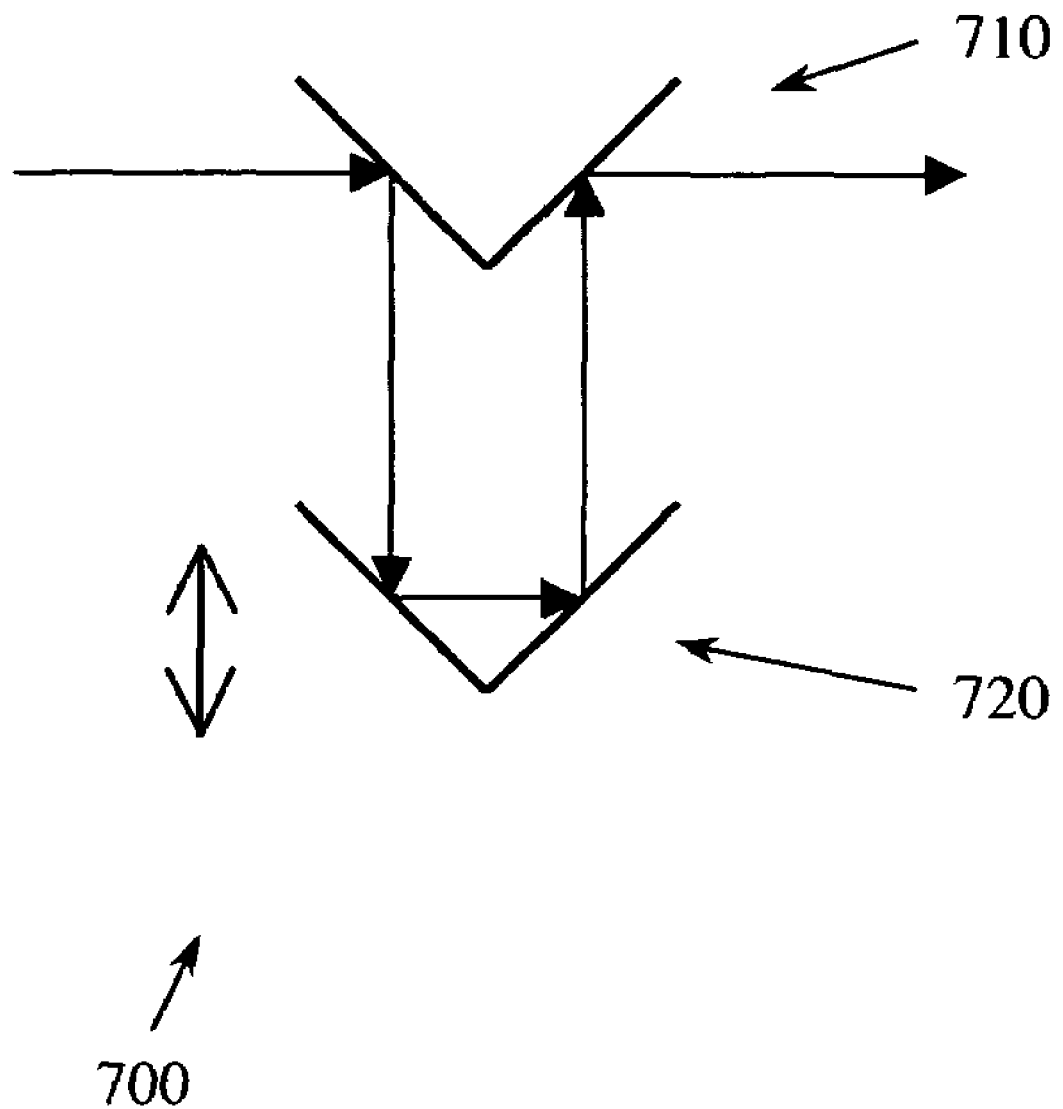
FIG. 7 is a schematic diagram depicting an adjustable delay according to an embodiment of the present invention.

FIG. 7 depicts an adjustable delay 700 according to an embodiment of the present invention. Adjustable delay 700 includes a first mirror set 710 and a second mirror set 720. Second mirror set 720 is translatable with respect to first mirror set 710. By adjusting the distance between first mirror set 710 and second mirror set 720, the photon path of travel may be shortened or lengthened accordingly. In operation, a photon beam entering adjustable delay 700 encounters first mirror set 710 and is diverted to second mirror set 720. Second mirror set 720 reflects back photons to first mirror set 710, which returns the photons to the beam. The increased distance provided by adjustable delay may be monitored using, by way of non-limiting example, interferometry. The particular arrangement for delaying photons disclosed by FIG. 7 is not meant to be limiting; other apparatuses for delaying photons are also contemplated.

Figure 8:
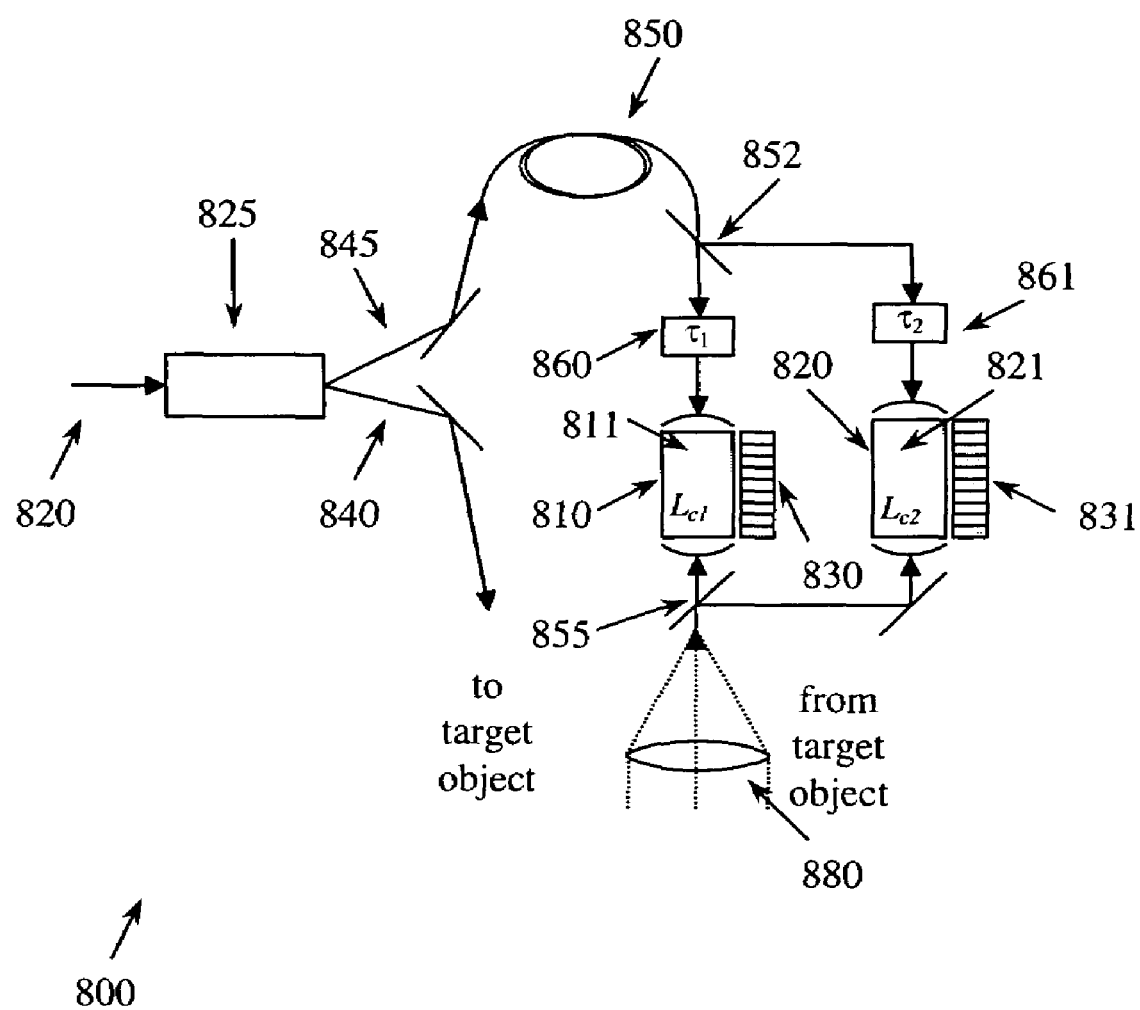
FIG. 8 is a schematic diagram depicting a two-cavity entangled-photon range finder embodiment.

FIG. 8 depicts an entangled-photon range finder embodiment in which two relatively short cavities are used to synthesize a much longer effective cavity length. As in the embodiment of FIG. 1, a pump beam 820 is directed to a nonlinear crystal 825, which provides entangled photons that are separated into signal photon beam 840 and idler photon beam 845. Also similar to the embodiment of FIG. 1, signal photons 840 are directed to the target object and their reflection is collected at aperture 880, and idler photons 845 are directed to polarization-preserving optical fiber 850, which delays idler photons 845 by an amount of time estimated to be about equal to the travel time of signal photon 840. In the embodiment of FIG. 8, after leaving fiber 850, idler beam 845 is separated using a half-silvered mirror 852 into two paths, each of which is directed through adjustable delays 860, 861 to independent optical cavities 810, 820, respectively. Reflected signal photons are sent from aperture 880 to a half-silvered mirror 855, which splits signal photons into two beams, each of which is directed to one of optical cavities 810, 820, respectively so as to counter-propagate with respect to idler photons.

Optical cavities 810, 820 are constructed according to the following. Each optical cavity 810, 820 is filled with BSM 811, 821, respectively. Optical cavity 810 of length $L_{c1}$ is partitioned into $M_1$ resolution cells of width $\Delta$. Preferably, the resolution cell width $\Delta$ is chosen as an integer number of photon wavelengths of pump beam 820. Each resolution cell is monitored for entangled-photon absorption by an associated detector 830. Similarly, optical cavity 820 of length $L_{c2}$ is partitioned into $M_2$ resolution cells also of width $\Delta$, each resolution cell being monitored for entangled-photon absorption by an associated detector 831. Thus, $L_{c1}=M_1\Delta$ and $L_{c2}=M_2\Delta$. The numbers of resolution cells in the respective optical cavities 810, 820 are preferably relatively prime (i.e., the greatest common divisor of $M_1$ and $M_2$ is one). Both optical cavities satisfy the biphoton resonance condition stated according to equation (12) and the surrounding description.

Each optical cavity 810, 820 may be used to independently resolve the distance to the target object up to an integer number of respective cavity lengths (i.e., modulo $L_{c1}$ or $L_{c2}$, respectively). That is, by employing equation (1) as discussed above in reference to FIG. 1, the numbers $d_0$ mod $L_{c1}$ and $d_0$ mod $L_{c2}$ may be determined. Note that two resolution cells in each cavity will likely register entangled-photon absorptions. As discussed above in reference to FIG. 1, adjustable delays 860, 861 may be used to determine which resolution cell in each optical cavity corresponds to the resolution cell where signal photons and corresponding idler photons are first present together. By way of non-limiting example, by perturbing adjustable delays 860, 861 and monitoring detectors 830, 831, respectively, the resolution cells $j_1$, $j_2$ where signal photons and corresponding idler photons are first present together in optical cavities 810, 820 may be determined. Once $j_1$ and $j_2$ are determined, equation (1) may be used to calculate $d_0$ mod $L_{c1}$ and $d_0$ mod $L_{c2}$.

The quantities $d_0$ mod $L_{c1}$ and $d_0$ mod $L_{c2}$ obtained from cavities 810, 820, respectively, may be used to determine the distance to the target object (at least modulo $M_1 M_2 \Delta$) as follows. For i=1,2, note that:

$$j_i = \left(int\frac{2d_0}{\Delta}\right) \bmod M_i = j_{\mathit{eff}} \bmod M_i. \qquad (24)$$

In equation (23), "int" denotes the nearest integer function. The symbol $j_{\mathit{eff}}$ denotes the position where signal photons and their corresponding idler photons would first be present together in an effective cavity having $M_1 M_2$ resolution cells each of width $\Delta$. When $M_1 M_2 \Delta \leq 2d_0$, the symbol $j_{\mathit{eff}}$ represents the effective number of intervals of length $\Delta$ to the target object and back; that is:

$$2d_0 = j_{\mathit{eff}} \Delta. \qquad (25)$$

The range to the target object may be calculated to within an accuracy of $\Delta$ by solving the system of modular equations $j_1 = j_{\mathit{eff}} \bmod M_1$ and $j_2 = j_{\mathit{eff}} \bmod M_2$ for $j_{\mathit{eff}}$, and plugging $\Delta$ and $j_{\mathit{eff}}$ into equation (25). The Chinese Remainder Theorem may be used to solve such systems of modular equations. Another technique for solving this system of modular equations is discussed below in reference to FIG. 9.

For embodiments such as the embodiment of FIG. 8 with two cavities, a general formula governing preferable conditions emerges. Combining the depth of field (equation (3)) with the computations involved with synthesizing a large effective cavity from two smaller cavities yields a relationship between the cavity length $L_c$, the mirror reflectance R and the range resolution $\Delta$, which may be represented as, by way of non-limiting example:

$$\Delta \leq L_c(1-R). \qquad (26)$$

When the condition represented by equation (26) is met, there is little or no possibility of range ambiguity, because the idler photon does not remain in either cavity long enough to meet up with signal photons from beyond the field of view, and conversely, the signal photons returning from in front of the field of view do not remain in either cavity long enough to meet up with the idler photons.

For multiple-cavity embodiments, such as that of FIG. 8, the depth of field discussion above in reference to equation (3) and FIGS. 3 and 4 is relevant with some amendments. In the case of multiple cavities, the smallest cavity lifetime from among the various cavities generally governs. With regard to the discussion of FIG. 3 above regarding range ambiguity, in the case of multiple cavities the relevant parameter is effective cavity length rather than actual cavity length.

Figure 9:
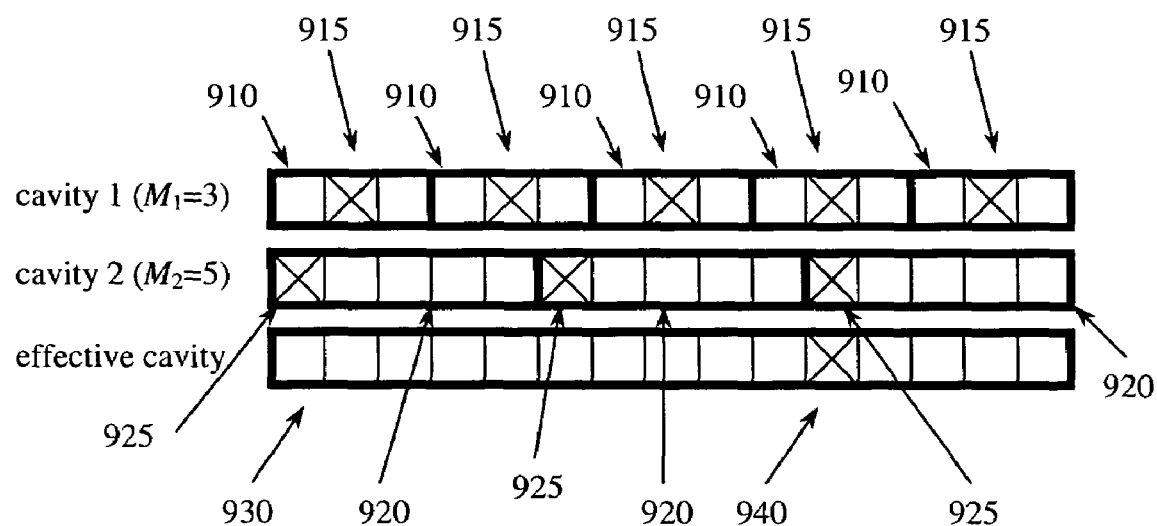
FIG. 9 is a graphical depiction of using two partial distance resolutions to achieve a complete distance resolution according to an embodiment of the present invention.

FIG. 9 graphically depicts how $j_1$ and $j_2$ may be used to determine $j_{eff}$ according to an embodiment of the present invention. With $M_1$ and $M_2$ relatively prime, $j_1$ and $j_2$ uniquely locate the position where signal photons and idler photons would first be present together in an effective optical cavity of length $L_{eff}=M_1M_2\Delta$. Thus two (or more) small optical cavities may be used to simulate a larger effective optical cavity for range-finding purposes. (By way of non-limiting example, a pair of optical cavities of lengths 101 cm and 103 cm with a detector width of 1 cm may be used to simulate a larger optical cavity whose length is $L_{eff}=104.03$ m. In that instance, $M_1=101$, $M_2=103$, and $\Delta=1$ cm.) FIG. 9 provides a non-limiting representation of the case where $M_1=3$, $M_2=5$, $j_1=2$ and $j_2=1$. The larger effective cavity 930 and $j_{eff}$ 940 may be represented graphically by laying $M_2$ copies of first cavity 910 end-to-end next to $M_1$ copies of second cavity 920. The position of $j_1$ 915 is marked on each copy of first cavity 910, and the position of $j_2$ 925 is marked on each copy of second cavity 920. The position $j_{eff}$ 940 in effective cavity 930 is where $j_1$ 915 and $j_2$ 925 align.

The distance to the target object may be computed as follows. For two cavities with $M_1<M_2$, and by way of non-limiting example, the following algorithm may be used to determine quantities $q_1$ and $q_2$, which are used to compute $j_{eff}$:

$$r \leftarrow \mod(M_2, M_2) \quad (27)$$
$$n \leftarrow M_1 - 1$$
$$p \leftarrow int\left(\frac{nr+1}{M_1}\right)$$
while
$$M_1 p \neq (nr+1)$$
$$n \leftarrow int\left(\frac{M_1 p - 1}{r}\right)$$
$$p \leftarrow int\left(\frac{nr+1}{M_1}\right)$$
$$q_2 \leftarrow \frac{nM_2+1}{M_1}$$
$$q_1 \leftarrow \frac{M_1 M_2 + 1 - q_2 M_1}{M_2}$$

Once algorithm (27) is used to determine $q_1$ and $q_2$, the value of $j_{eff}$ is determined, by way of non-limiting example, as:

$$j_{eff}=(j_1 q_1 M_1 + j_2 q_2 M_2) \mod M_1 M_2. \quad (28)$$

The distance $d_0$ to the target object may then be determined (modulo $L_{eff}$) by substituting the value of $j_{eff}$ determined using equation (28) and algorithm (27) into equation (25).

In general, multiple cavities may be used to simulate a larger cavity whose effective length is, by way of non-limiting example:

$$L_{eff} = \Delta \prod_i^{N_c} M_i. \quad (29)$$

In equation (29), $N_c$ is the number of cavities (which may be greater than two), with the i-th cavity having $M_i$ resolution cells of width $\Delta$ for $i=1, \ldots, N_c$. Resolution cell numbers $M_i$, $M_1$ are preferably relatively prime (i.e., the greatest common divisor of $M_i$ and $M_j$ is one whenever $i \neq j$). The Chinese Remainder Theorem may be used to solve systems of modular equations toward determining the distance to the target object.

Figure 10:
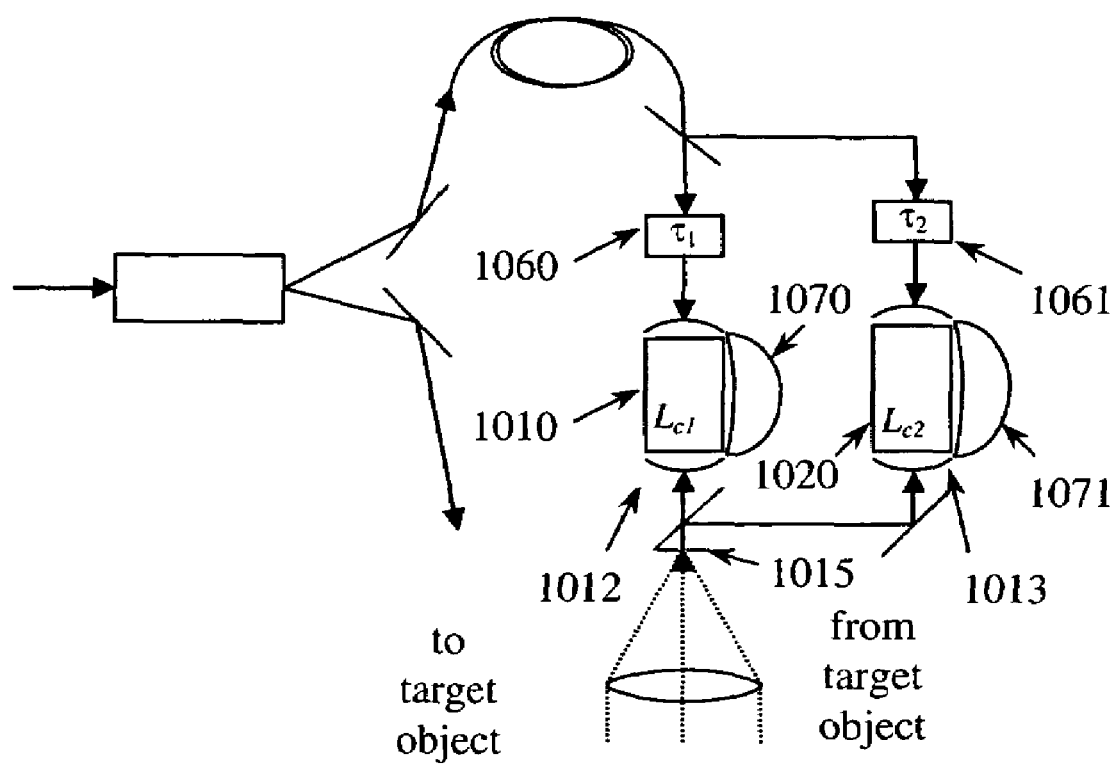
FIG. 10 is a schematic diagram depicting a two-cavity entangled-photon range finder embodiment.

FIG. 10 depicts a two-cavity entangled-photon range finder embodiment. In the embodiment of FIG. 10, incoming signal photons pass through filter 1015 before entering cavity 1010. The embodiment of FIG. 10 is similar to that of FIG. 8, except that here, the signal photons and idler photons are synchronized. More particularly, the idler photons are delayed using adjustable delays 1060, 1061 by amounts of time sufficient to ensure that each idler photon is reflected off its respective mirror 1012, 1013 within the entanglement time interval of the signal photon with which it is entangled entering optical cavity 1010, 1020 or being reflected off mirrors 1012, 1013, respectively. Thus, in each optical cavity 1010, 1020, the signal photons propagate together with the idler photons with which they are entangled. Maximal absorption occurs in optical cavity 1010 (i=1) or optical cavity 1020 (i=2) when, by way of non-limiting example:

$$2d_o = d_{sys} + \tau_i + (2n+1)L_{ci}. \quad (30)$$

In equation (30), $\tau_1$ is the additional optical path length added by adjustable delay 1060, and $\tau_2$ is the additional optical path length added by adjustable delay 1061. For $i=1,2$, the domain over which each $\tau_i$ is searched in order to maximize biphoton absorption is from zero to $2L_{ci}$. A technique of maximizing biphoton absorption by adjusting idler photon path length to align signal photons and idler photons is discussed above in reference to FIGS. 5-7.

Because entangled photons propagate together in the embodiment of FIG. 10, there is a high probability of biphoton absorption by the BSM. That is, the entangled photons' interaction time (i.e., the time in which they are within their entanglement length of each-other) approaches the photons' lifetime in their respective optical cavities, resulting in improved probability of biphoton absorption. Biphoton absorption can take place at any point in the optical cavities 1010, 1020. Thus, a single detector 1070, 1071, respectively, will suffice for each cavity.

The two-cavity range finder embodiment of FIG. 10 may be used to resolve great distances using relatively short optical cavities. The embodiment of FIG. 10 accomplishes this by simulating a relatively long effective cavity with two relatively short cavities. As discussed above in reference to FIG. 5, the entanglement length is the effective resolution cell width $\Delta$ for this embodiment. By way of non-limiting example, a two-cavity range finder with $\Delta=60$ μm, $L_{c1}=24.47$ cm, $L_{c2}=24.55$ cm, (so $M_1=4079$, $M_2=4091$) results in $L_{eff}=1001.23134$ m. Thus, a device measuring less than one-quarter meter long may resolve distances of up to slightly more than a kilometer relative to the nominal range.

Figure 11:
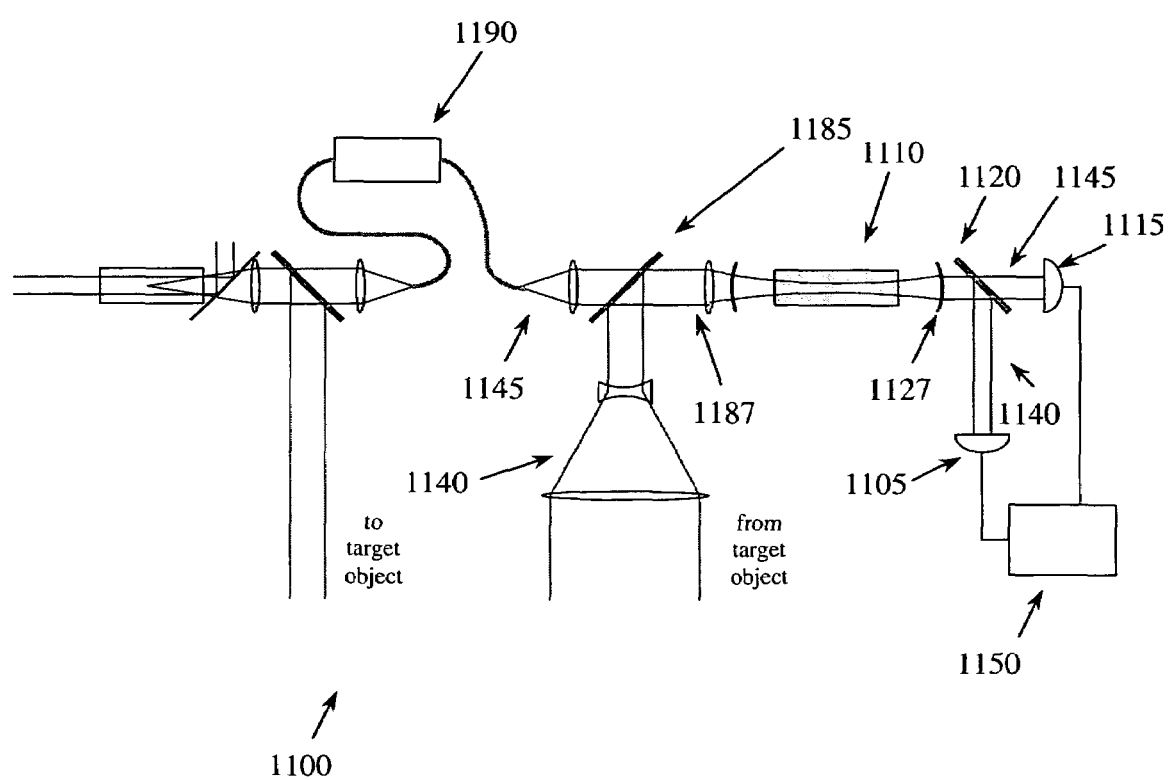
FIG. 11 is a schematic diagram depicting an electronic coincidence counter entangled-photon range finder embodiment.

FIG. 11 depicts an electronic coincidence counter entangled-photon range finder embodiment 1100. Details of entangled range finder 1100 are similar to those of the embodiment of FIG. 5, except that an electronic coincidence counter 1150 is used to detect correlation between entangled signal and idler photons instead of a BSM. Similar to the embodiment of FIG. 5, idler photons 1145 leaving binary coil bank 1190 and signal photons 1140 returning from the target object are passed into a combined beam 1187 using polarizing beam splitter 1185. Combined beam 1187 is directed to optical cavity 1110. Photons leaving optical cavity 1110 through mirror 1127 are directed to polarizing beam splitter 1120. Polarizing beam splitter 1120 separates signal photons 1140 from idler photons 1145. Signal photons 1140 are directed to detector 1105, and idler photons are directed to detector 1115. Detectors 1105, 1115 are electrically connected to electronic coincidence counter 1150. Coincidence counter 1150 is configured to detect a correlation between signal photons 140 and the idler photons 145 with which they are entangled. Coincidence counter 1150 may feed coincidence information to an internal computer or to an external computer.

Detection events at idler photon detector 1115 act as a trigger for a coincidence window. To account for path length difference between signal photons and idler photons, a coincidence delay is set electronically between the trigger and the start of the coincidence window. Alternately, or in addition to the electronic coincidence delay, an adjustable delay may be used such as that depicted in FIG. 5. After the coincidence delay, the coincidence window begins. Coincidence counter 1150 registers a coincidence count whenever a detection event occurs at signal photon detector 1105 within the coincidence window.

Optical cavity 1110 provides several advantages in the electronic coincidence counter embodiment of FIG. 11 in that fine tuning may be accomplished electronically instead of, e.g., with optical delay 700 of FIG. 7. The total delay time produced by binary coil bank and other spatial or electronic delays need not exactly equal the delay caused by the signal photon traveling to and returning from the target object in order to gain distance information. Instead, the distance to the target object is computed modulo the cavity length and multiple cavities are used to resolve the ambiguity. The domain over which coincidence delay values are tested in order to detect a correlation may be limited to between zero and $2L_c/c$, where $L_c$ is the length of the cavity. Use of optical cavity 1110 thus provides a concise search domain for delay times that correlate the signal and idler photons. Optical cavity 1110 effectively limits the delay values that need to be tested. Without an optical cavity, correlation might require testing all possible delay values that a single photon may produce in traveling to and returning from a target object. With optical cavity 1110, test values are limited to a manageable interval.

Coincidence counter 1150 will generally register a coincidence count for every biphoton whose component photons are both detected. However, detection is a function of at least the quantum efficiency of detectors 1105, 1115. Typically, the coincidence window is larger than the entanglement time due to the speed of electronics. It is however possible to achieve coincidence windows that are on the order of a few tens of picoseconds.

The range resolution for the embodiment of FIG. 11 is dependent on the coincidence window length. The resolution may be represented as, by way of non-limiting example:

$$\Delta = \frac{cT_c}{2}. \tag{31}$$

In equation (31), $\Delta$ represents the ranging resolution or accuracy and $T_c$ is the coincidence window length.

A typical coincidence count rate is estimated presently. For a coincidence counter triggered by the detection of idler photons 1145, the biphoton coincidence count rate is the rate at which idler photons 1145 are detected multiplied by the probability that the corresponding signal photon 1140 is detected within the coincidence window. The biphoton coincidence rate may be represented as, by way of non-limiting example:

$$\Phi_{cc\_bi}(\tau, \tau_w) = p_s \eta_s p_i \eta_i \Phi_{bi} \int_{t_2+\tau_w}^{t_2+\tau_w+T_c} |A_{cav}(t_1, t_2)|^2 dt_1 \tag{32}$$

$$= p_s \eta_s p_i \eta_i \Phi_{bi} R^{nint\left(\frac{c\tau}{2L_c}\right)} \frac{(1-R)^2}{(1+R)^2} O(\tau, \tau_w).$$

In equation (32), $\eta_s$ and $\eta_i$ are the quantum efficiencies of detectors 1105, 1115, respectively. The terms $p_s$ and $p_i$ are the probabilities that the signal photon returns from the target and reaches detector 1105 and that the idler photon makes it through delay 1190, respectively. The symbol $\tau$ represents the path delay of the signal photon resulting from its round-trip to the target object (i.e., $\tau = 2d_0/c$). The symbol $\tau_w$ represents the electronically-implemented coincidence delay. $T_c$ represents the length of the coincidence window. The symbol $\Phi_{bi}$ represents the rate of biphoton generation. The function $O(\tau, \tau_w)$ can be written as, by way of non-limiting example:

$$O(\tau, \tau_w) = \begin{cases} 0 & (\tau' < \tau_w - DL) \text{ or } (\tau' > \tau_w + T_c) \\ 1 & \tau_w \leq \tau' \leq \tau_w + T_c - DL \\ \left(1 - \frac{\tau_w - \tau'}{DL}\right) & \tau_w - DL \leq \tau' \leq \tau_w \\ \left(\frac{\tau_w - \tau' - T_c}{DL}\right) & \tau_w + T_c - DL < \tau' \leq \tau_w + T_c \end{cases} \tag{33}$$

In equation (33), the symbol $\tau'$ represents, by way of non-limiting example:

$$\tau' = \tau - \frac{2L_c}{c} nint\left(\frac{c\tau}{2L_c}\right). \tag{34}$$

Accidental coincidences occur when the photon detected during the coincidence window is not entangled with the idler photon that triggered it. Such accidental coincidences contribute to the background coincidence count, which is independent of the coincidence delay. The background coincidence count may be represented as, by way of non-limiting example:

$$\Phi_{cc\_bg} = p_s \eta_s p_i \eta_i \Phi_{cav}^2 T_c. \tag{35}$$

In equation (35), the symbol $\Phi_{cav}$ is given as, by way of non-limiting example:

$$\Phi_{cav} = \int_{\frac{\omega_p}{2}-\frac{\Omega}{2}}^{\frac{\omega_p}{2}+\frac{\Omega}{2}} d\omega \Phi(\omega) \frac{G_1 G_2}{\left|1 - \sqrt{R_1 R_2} \, e^{i\left(2L_c \frac{\omega}{c} + \phi_1 \phi_2\right)}\right|^2}. \quad (36)$$

In equation (36), $\Omega$ represents the bandwidth of the entangled photons, which would be centered at $\omega_p/2$ for the degenerate case. The symbol $\Phi(\omega)$ represents the power spectrum of the entangled photons. If the bandwidth is much greater than the free spectral range of optical cavity 1110, then for identical lossless mirrors, background coincidence count may be represented as, by way of non-limiting example:

$$\Phi_{cc\_bg} = p_s \eta_s p_i \eta_i \Phi_{bi}^2 T_c \frac{(1-R)^2}{(1+R)^2}. \quad (37)$$

The total coincidence count rate is the sum of the biphoton coincidence count rate (equation (32)) and the accidental count rate (equation (37)) and may be represented as, by way of non-limiting example:

$$\Phi_{cc}(\tau, \tau_w) = \Phi_{cc\_bi} + \Phi_{cc\_bg} \quad (38)$$

$$= p_s \eta_s p_i \eta_i \Phi_{bi} \frac{(1-R)^2}{(1+R)^2}$$

$$\left[R^{nint\left(\frac{c\tau}{2L_c}\right)} O(\tau, \tau_w) + \Phi_{bi} T_c\right].$$

A particular adjustable delay setting or coincidence delay is deemed to be correct when it yields a maximum in the observed count rate. Such judgment may be performed automatically by suitable computer hardware or software.

Finding a $\tau$ that maximizes the observed count rate determines the distance to the target object modulo $2L_c$. An additional cavity arrangement as described above in reference to FIGS. 8-10, but incorporating an electronic coincidence counter instead of a BSM, may be inserted into the embodiment of FIG. 11 to synthesize a longer effective cavity, thereby permitting measurement of the actual distance to the target object for distant target objects.

Typical signal to noise rates for the embodiment of FIG. 11 are estimated presently. The associated root-mean-square Poisson noise is proportional to the square root of the total count rate multiplied by the electronics bandwidth. The signal-to-noise ratio may be written as, by way of non-limiting example:

$$SNR = \frac{\Phi_{cc\_bi}(\tau, \tau_w)}{\sqrt{2B\Phi_{cc}(\tau, \tau_w)}} \quad (39)$$

$$= R^{nint\left(\frac{c\tau}{2L_c}\right)} O(\tau, \tau_w) \frac{(1-R)}{(1+R)}$$

$$\sqrt{\frac{p_s \eta_s p_i \eta_i}{2B\left[\frac{R^{nint\left(\frac{c\tau}{2L_c}\right)} O(\tau, \tau_w)}{\Phi_{bi}} + T_c\right]}}.$$

According to equation (39), a signal is only present when $O(\tau, \tau_w)$ is non-zero. If the length of the coincidence window is much greater than the entanglement time, $\tau_w$ can be adjusted such that $O(\tau, \tau_w)$ is one. For a high quality mirror (e.g., $R \approx 1$), the signal-to-noise ratio may be estimated as, by way of non-limiting example:

$$SNR \approx (1-R) \sqrt{\frac{p_s \eta_s p_i \eta_i}{8R\left(\frac{1}{\Phi_{bi}} + T_c\right)}}. \quad (40)$$

The accidental-coincidence-limited case (i.e., $T_c \Phi_{bi} \gg 1$) may yield a suitable signal-to-noise ratio. However, coincidence counter 1150 typically cannot distinguish between multiple events that arrive within the coincidence window. Therefore, the system is preferably operated in a regime where the number of detection events (on either detector 1105, 1115) in a coincidence window length is, on average, much less than one. This situation may be represented as, by way of non-limiting example:

$$\Phi_{bi} p_s \eta_s \frac{(1-R)}{(1+R)} T_c \ll 1 \quad (41)$$

and $$\Phi_{bi} p_i \eta_i \frac{(1-R)}{(1+R)} T_c \ll 1.$$

For mirrors of high reflectance, both the accidental-coincidence-limited case and the situation described in equation (41) may be achieved simultaneously.

A typical signal-to-noise ratio may be calculated using the following illustrative and non-limiting parameters. A 10% quantum efficiency for both detectors 1105, 1115, 99% reflective mirrors, a 1 nanosecond coincidence window, a biphoton flux of $10^{11}$ biphotons per second, and an integration time of 0.1 second, yields a signal-to-noise ratio of 3.5 (5.4 dB), as seen in Table 1 below. For certain embodiments, the term "integration time" refers to the amount of time spent testing each coincidence delay setting. In general, the term "integration time" refers to the amount of time spent collecting data to be used for a calculation. A sophisticated coincidence counter could evaluate, in a single integration time interval, each coincidence delay the size of a coincidence window partitioning the interval $[0, 2L_c]$.

TABLE 1

| Signal-to-noise | |
| --- | --- |
| Biphoton flux | 1.00E+11 |
| Efficiency product | 0.01 |
| Tc | 1.00E−09 |
| R | 0.99 |
| B | 10 |
| SNR | 3.517987724 |

Figure 12:
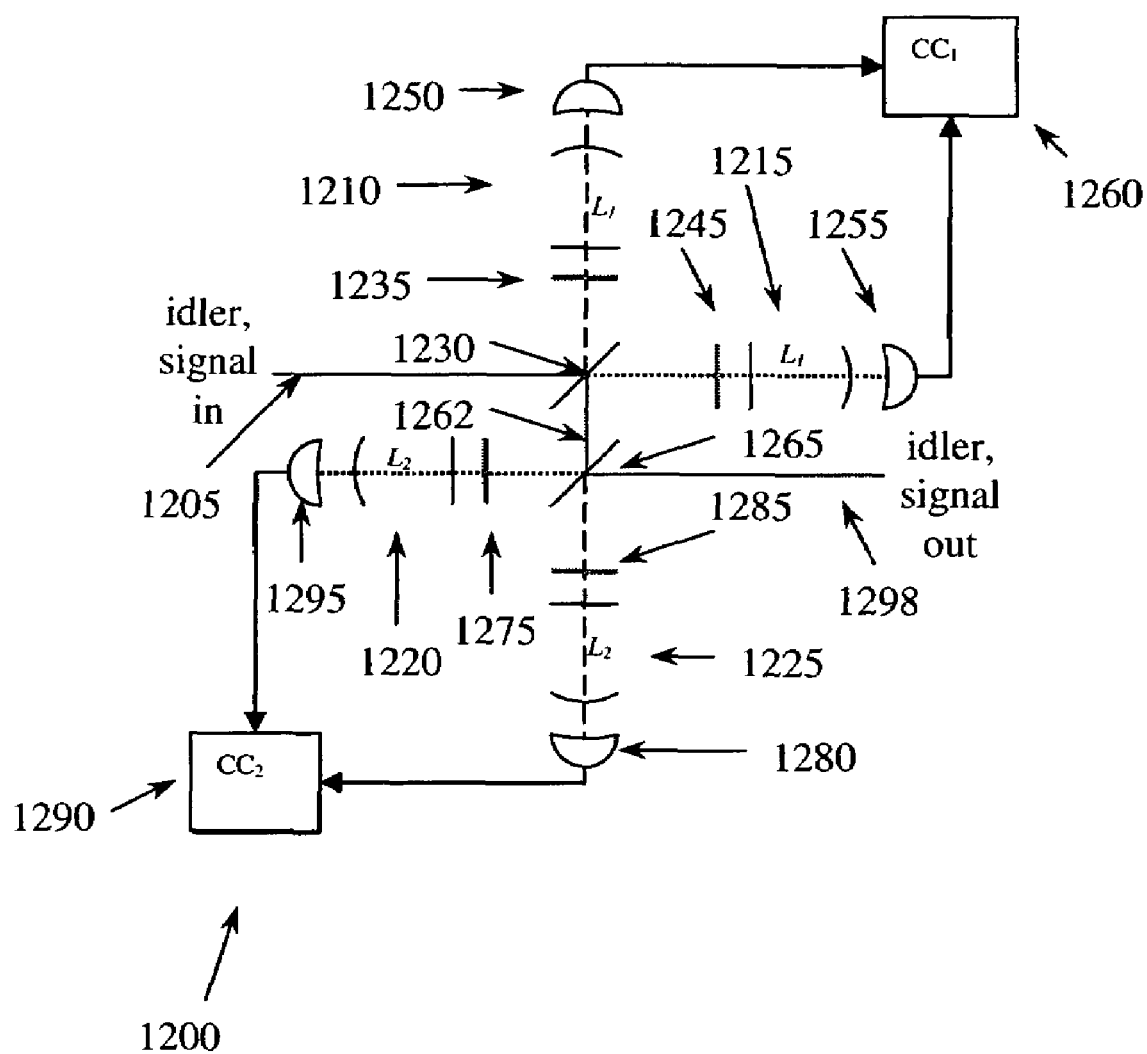
FIG. 12 is a schematic diagram depicting an optical cavity configuration for an entangled-photon range finder embodiment.

FIG. 12 depicts an optical cavity configuration for an entangled-photon range finder embodiment. In particular, FIG. 12 depicts an arrangement of cavities for use in entangled-photon range finder embodiments that use an electronic coincidence counter to correlate signal photons with idler photons. Incoming signal photons and idler photons 1205 are directed to polarizing beam splitter 1230. Polarizing beam splitter 1230 reflects signal photons (dashed line) to quarter-wave plate 1235. In FIG. 12, each quarter-wave plate generally serves to convert entering photons of one linear polarization into photons of another linear polarization at 90° to the first polarization upon the photons passing through the quarter-wave plate in one direction, being reflected, and passing back through the quarter-wave plate in the opposite direction. Signal photons reflected from polarizing beam splitter 1230 enter quarter-wave plate 1235, which converts linearly-polarized photons to circularly-polarized photons and vice versa. A portion of the circularly-polarized photons enters optical cavity 1210 of length $L_1$, and a portion is reflected back to quarter-wave plate 1235. Quarter-wave plate converts reflected circularly-polarized photons to linearly-polarized photons having an orientation at 90° to that of the originally entering signal photons, which allows them to pass through polarizing beam splitter 1230. Incoming idler photons included in beam 1205 pass through polarizing beam splitter 1230, quarter-wave plate 1245, and on to optical cavity 1215 of length $L_1$. A portion of these idler photons enter optical cavity 1215, and a portion are reflected back to quarter-wave plate 1245. Quarter-wave plate 1245 changes the polarization of these idler photons such that they are reflected by polarizing beam splitter 1230 into combined signal photon and idler photon beam 1262.

Combined signal photon and idler photon beam 1262 reaches polarizing beam splitter 1265, which reflects idler photons (dotted line) to quarter-wave plate 1275 and passes signal photons (dashed line) to quarter-wave plate 1285. A portion of the signal photons that pass through quarter-wave plate 1285 enter optical cavity 1225 of length $L_2$, and a portion are reflected back through quarter wave plate 1285. These reflected signal photons are reflected by polarizing beam splitter 1265 into beam 1298. A portion of the idler photons that pass through quarter-wave plate 1275 enter optical cavity 1220 of length $L_2$, and a portion are reflected back through quarter wave plate 1275. The reflected idler photons pass through polarizing beam splitter 1265 and join the signal photons in combined signal photon and idler photon beam 1298. Combined signal photon and idler photon beam 1298 may be directed to one or more subsequent optical cavity configurations.

Coincidence counters 1260, 1290 detect coincidence from their associated pairs of cavities. Coincidence counter 1260 receives input from detectors 1250, 1255. Detector 1250 detects the signal photons that pass through optical cavity 1210, and detector 1255 detects idler photons that pass through optical cavity 1215. Similarly, coincidence counter 1290 receives input from detectors 1280, 1295. Detector 1280 detects the signal photons that pass through optical cavity 1225, and detector 1295 detects idler photons that pass through optical cavity 1220. Each coincidence counter 1260, 1290 thereby detects coincidence between signal photons and idler photons. Coincidence detector 1260 detects such coincidence after the photons have passed through optical cavities 1210, 1215 of length $L_1$, and coincidence detector 1290 detects such coincidence after the photons have passed through optical cavities 1220, 1225 of length $L_2$.

The optical cavity configuration depicted in FIG. 12 may be used in conjunction with a variety of entangled-photon range finder embodiments. By way of non-limiting example, the optical cavity configuration of FIG. 12 may be inserted in the range finder embodiment of FIG. 11. More particularly, the configuration depicted in FIG. 12 may be substituted for the optical cavity 1110 in FIG. 11 by using the combined signal photon and idler photon beam 1187 as the combined signal photon and idler photon beam 1205. In such a combination, the portion depicted in FIG. 12 replaces optical cavity 1110, its mirrors, and its detector 1150. Moreover, such a combination using pairs of optical cavities is able to resolve ranges to target objects up to a relatively long effective cavity length in the manner describe above in reference to FIGS. 8-10. In particular, the configuration of FIG. 12 correlates signal photons with idler photons in a pair of cavities of identical length $L_1$. The configuration also correlates signal photons and idler photons in a pair of cavities of identical length $L_2$. For purposes of correlation, it makes no difference if signal photons and idler photons are present together in the same cavity or in different cavities of equal length. Accordingly, by choosing appropriate lengths and $L_1$ and $L_2$, an effective cavity of much greater length may be synthesized as described above in reference to FIGS. 8-10.

The optical cavity configuration of FIG. 12 has several advantages. The mirrors used in optical cavities 1210, 1215, 1220, 1225 are highly reflective. Thus, most of the photons directed to the first pair of optical cavities 1210 and 1215 will be reflected and subsequently directed to the second pair of optical cavities 1220 and 1225. Most of these photons will be reflected and pass to combined signal photon and idler photon beam 1298. More correlations (e.g., those arising from optical cavities of a different length) may be gathered by cascading additional optical cavity configurations, such as an optical cavity configuration of FIG. 12, after beam 1298. The configuration of FIG. 12 also has the advantage of avoiding using half-silvered mirrors to provide multiple combined signal photon and idler photon beams for multiple cavities of different lengths. While this technique may be used, it results in lower signal-to-noise ratios than can be achieved using the configuration of FIG. 12. The optical cavity configuration of FIG. 12 also has many of the advantages of optical cavity 1110. The configuration of FIG. 12 allows for flexibility in interposing a delay in that the signal photon delay need not be exactly matched. It also effectively limits the delay values that need to be tested to achieve correlation to a manageable interval.

Figure 13:
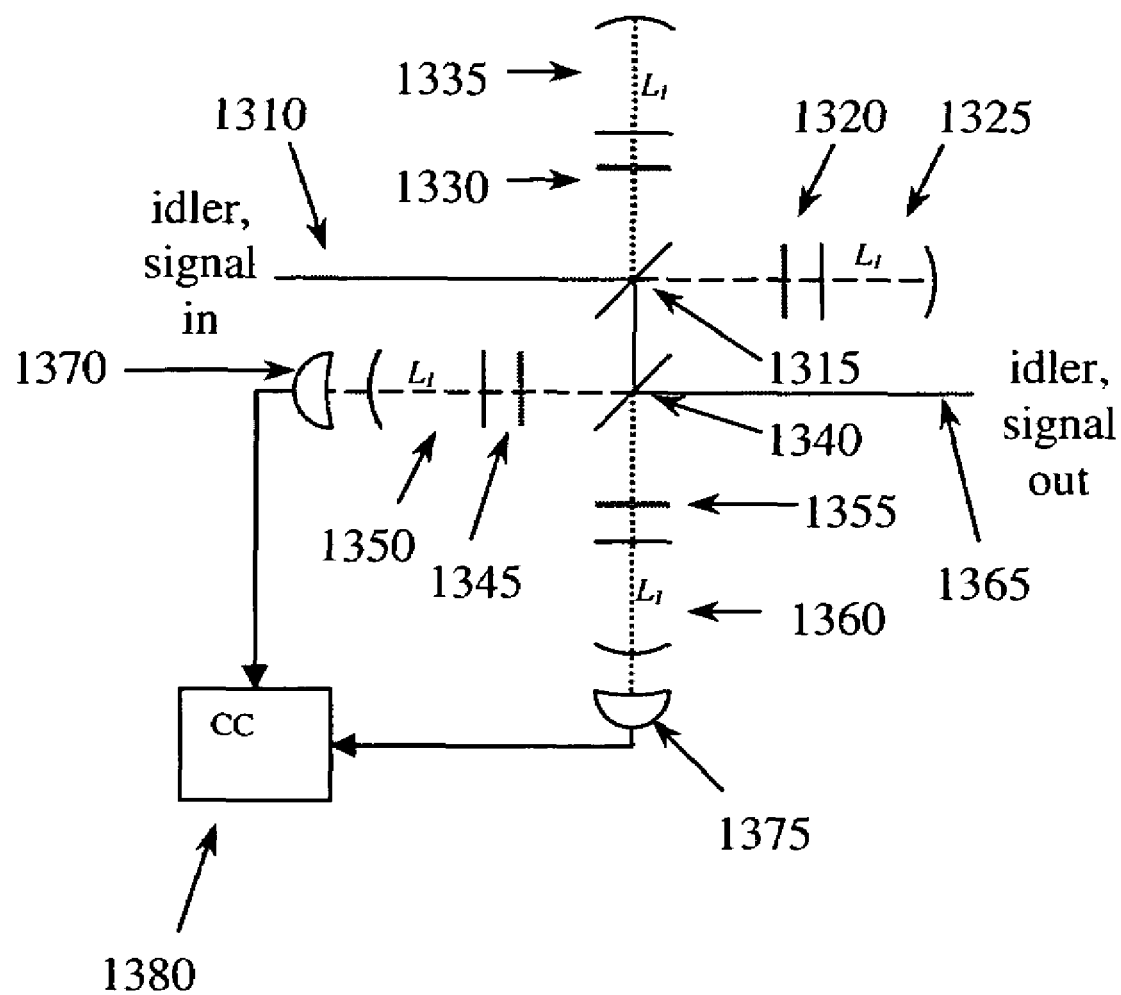
FIG. 13 is a schematic diagram depicting a spectral filtering optical cavity configuration according to an embodiment of the present invention.

FIG. 13 depicts a spectral filtering optical cavity configuration according to an embodiment of the present invention. A combined signal photon and idler photon beam 1310 is directed to polarizing beam splitter 1315, which allows signal photons (dashed line) to pass through while reflecting idler photons (dotted line). The signal photons pass through quarter wave plate 1320 to optical cavity 1325 of length $L_1$. The quarter-wave plates 1320, 1330, 1345, 1355 of FIG. 13 generally serve the same function as those of FIG. 12, namely, to convert entering photons of one linear polarization into photons of another linear polarization at 90° to the first polarization upon the photons passing through the quarter-wave plate in one direction, being reflected, and passing back through the quarter-wave plate in the opposite direction. The idler photons reflected off of polarizing beam splitter 1315 pass through quarter wave plate 1330 to optical cavity 1335 also of length $L_1$. Both signal and idler photons that are reflected by their respective cavities 1325, 1335 return to polarizing beam splitter 1315, which directs them to polarizing beam splitter 1340. Signal photons reflected off of polarizing beam splitter 1315 are reflected off of polarizing beam splitter 1340, through quarter-wave plate 1345, and to optical cavity 1350 of length $L_1$. Idler photons passing through polarizing beam splitter 1315 also pass thorough polarizing beam splitter 1340, quarter wave plate 1355, and reach optical cavity 1360 of length $L_1$. Signal photons that leave optical cavity 1350 and idler photons that leave optical cavity 1360 are directed by polarizing beam splitter 1340 to combined signal photon and idler photon beam 1365, which may be directed to additional optical cavity arrangements. By way of non-limiting example, such an additional optical cavity arrangement may be a spectral filtering optical cavity configuration as depicted in FIG. 13 having cavities of length $L_2$ different from $L_1$ so as to synthesize a long effective cavity. Detectors 1370, 1375 are configured to detect photons and report the same to coincidence counter 1380.

The configuration of FIG. 13 is designed to improve the signal-to-noise ratio by filtering out individual signal and idler photons that are resonant with the optical cavities. Individual photons resonant with optical cavities constitute the majority of photons that contribute to accidental coincidence counts. Removing such photons may reduce the accidental coincidence rate by an order of magnitude or more while reducing the biphoton coincidence rate by only the fraction of the spectrum removed. To remove the photons resonant with the ranging cavity, both beams are reflected off other cavities of the same length. This arrangement provides the requisite filtering due in part to the fact that, under the biphoton resonance condition (equation (12)) the biphoton amplitude is independent of the frequencies of the photons, yet the individual count rates which contribute to the accidental coincidence count rate are functions of the individual signal and idler frequencies. FIG. 13 depicts such a configuration where four cavities of the same length are used.

Configuring the first pair of optical cavities 1325, 1335 to have a lower finesse than the second pair of optical cavities 1350, 1360 helps to reduce the accidental coincidence rate. For this configuration, the signal photon and idler photon fluxes may be represented as, by way of non-limiting example:

$$\Phi_{cav} = p_x \int_{\frac{\omega_p}{2} - \frac{\Omega}{2}}^{\frac{\omega_p}{2} + \frac{\Omega}{2}} d\omega \Phi(\omega) \left[ 1 - \frac{(1-R_1)^2}{\left| 1 - R_1 e^{i(2L_c \frac{\omega}{c} + \phi_1 + \phi_2)} \right|^2} \right] \qquad (42)$$

$$\frac{(1-R_2)^2}{\left| 1 - R_2 e^{i(2L_c \frac{\omega}{c} + \phi_1 + \phi_2)} \right|^2}.$$

In equation (42), $R_1$ is the reflectance of the mirrors (assumed for purposes of exposition to be lossless) for the first pair of optical cavities 1325, 1335 and $R_2$ is the reflectance of the mirrors for the second pair of optical cavities 1350, 1360. The symbol $p_x$ represents the probability that a signal photon returns to the device when x=s, and represents the probability that an idler photon passes through to reach the optical cavities when x=i.

The signal-to-noise ratio for the configuration of FIG. 13 is estimated presently. If the bandwidth is much greater than the free spectral range, the signal photon and idler photon fluxes can be approximated as, by way of non-limiting example:

$$\Phi_{cav} = p_x \Phi_{bi} \left[ \frac{1-R_2}{1+R_2} - \frac{(1-R_1)(1-R_2)(1+R_1R_2)}{(1+R_1)(1+R_2)(1-R_1R_2)} \right]. \qquad (43)$$

Under these circumstances, the accidental coincidence count rate may be approximated as, by way of non-limiting example:

$$\Phi_{cc\_bg} = p_s \eta_s p_i \eta_i \Phi_{bi}^2 T_c \left[ \frac{1-R_2}{1+R_2} - \frac{(1-R_1)(1-R_2)(1+R_1R_2)}{(1+R_1)(1+R_2)(1-R_1R_2)} \right]^2. \qquad (44)$$

The biphoton coincidence rate is accordingly reduced to, by way of non-limiting example:

$$\Phi_{cc\_bi}(\tau, \tau_w) = p_s \eta_s p_i \eta_i \Phi_{bi} R_2^{nint\left(\frac{c\tau}{2L_c}\right)} \frac{(1-R_2)^2}{(1+R_2)^2} \left[ \frac{2R_1}{1+R_1} \right]^2 O(\tau, \tau_w). \qquad (45)$$

For a coincidence delay set such that $O(\tau, \tau_w)$ is one and $R_2$ being close to one, the signal-to-noise ratio for the configuration of FIG. 13 may be approximated as, by way of non-limiting example:

$$SNR \approx (1-R_2) \left[ \frac{2R_1}{1+R_1} \right] \sqrt{\frac{p_s \eta_s p_i \eta_i}{8B \left( \frac{1}{\Phi_{bi}} + \left[ \frac{(1-R_2)}{(1-R_1R_2)} \right]^2 T_c \right)}}. \qquad (46)$$

The spectral filtering configuration of FIG. 13 has at least two effects. The first is a reduction in signal due to the loss of biphotons, which is a function of $R_1$ as evidenced by its appearance in the term in brackets in front of the square root in equation (46). The second effect is a significant reduction in the accidental coincidence rate relative to the biphoton coincidence rate, which improves the accidental-coincidence-limited signal-to-noise ratio. This is evidenced by the term in front of $T_c$ in equation (44), which is a function of both $R_1$ and $R_2$. The advantages of the second effect make up for the loss of biphotons as per the first effect. A relatively higher flux may be required to reach the accidental-coincidence-limited case.

The spectral filtering configuration of FIG. 13 may be used in any of the previous electronic coincidence counter embodiments. By way of non-limiting example, it may be substituted for the optical cavity 1110 in the embodiment of FIG. 11. Further, it may be cascaded with an additional spectral filtering configuration having cavities of a different length, for example to synthesize a long effective cavity.

The spectral filtering configuration of FIG. 13 has advantages similar to those of the other optical cavities and their arrangements. By way of non-limiting example, it allows for flexibility in estimating the signal photon delay, in that the imposed idler photon delay (whether electronic or otherwise) need not be matched exactly. Further, it narrows the range of delay values to be tested to a manageable interval.

Figure 14:
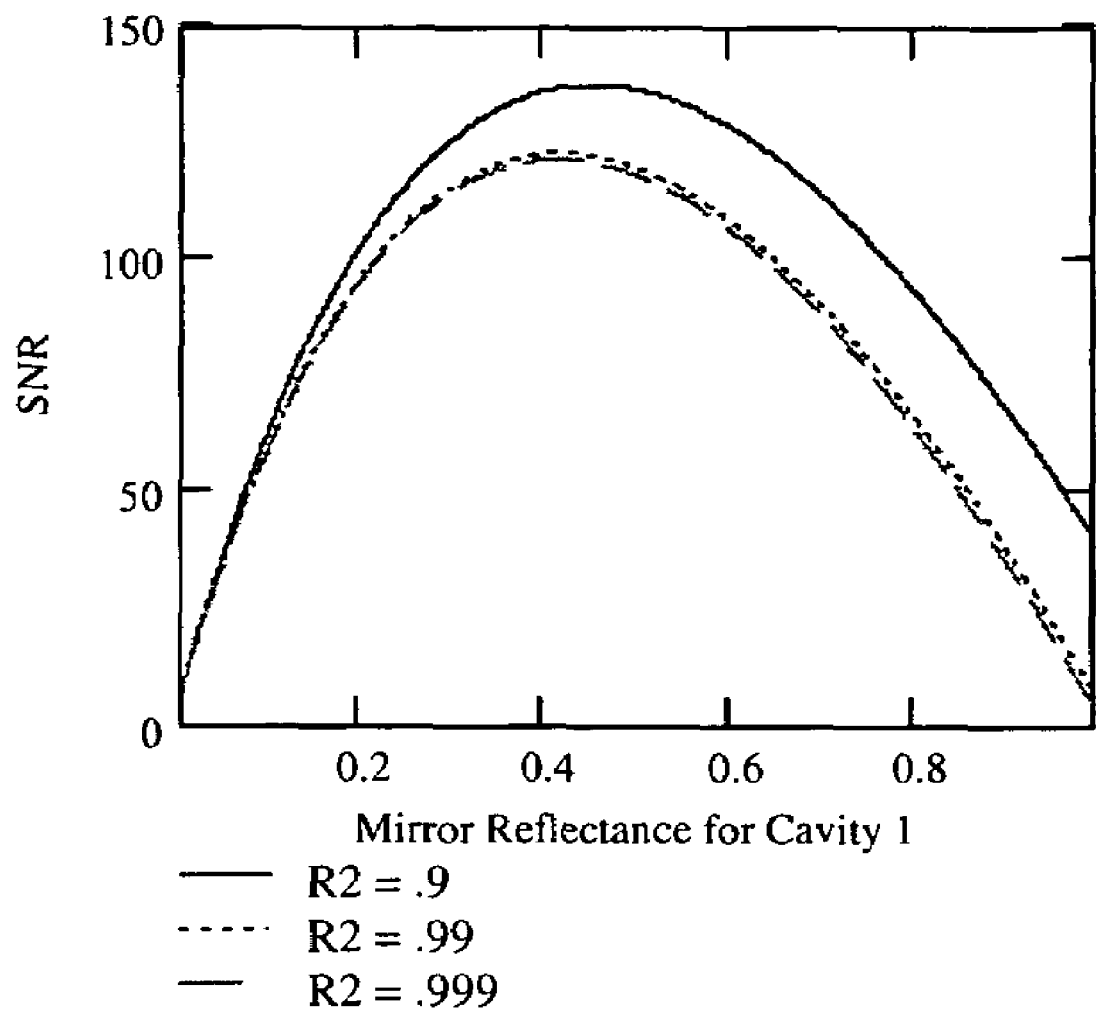
FIG. 14 is a graph depicting a signal-to-noise ratio as a function of mirror reflectance according to various embodiments of the present invention.

FIG. 14 is a chart depicting accidental-coincidence-limited signal-to-noise ratio as a function of mirror reflectance for the optical cavity configuration of FIG. 13 according to various embodiments of the present invention. Specifically, FIG. 14 depicts plots of signal-to-noise as a function of $R_1$ for several values of $R_2$. The plots of FIG. 14 use the same parameters as were used for Table 1, except that in FIG. 14 the flux is $10^{18}$ instead of $10^{11}$ biphotons per second in order to reach the accidental coincidence limit for the $R_2$=0.999 case. The results depicted in FIG. 14 are better than those of Table 1, in that the latter has signal-to-noise of 3.5, while the former has a signal-to-noise ratio of 123. Thus, the configuration of FIG. 13 yields a 15 dB improvement in signal-to-noise as compared to the configuration of FIG. 11 as represented in Table 1. Note that in the accidental-coincidence-limited case, the signal-to-noise can be approximated as, by way of non-limiting example:

$$SNR \approx \left[\frac{2R_1(1-R_1R_2)}{1+R_1}\right]\sqrt{\frac{p_s\eta_s p_i\eta_i}{8BT_c}}. \tag{47}$$

The signal-to-noise approximation for the accidental-coincidence-limited case applies as long as the condition represented by the following non-limiting exemplary formula obtains:

$$T_c\Phi_{bi} \gg \left[\frac{(1-R_1R_2)}{(1-R_2)}\right]^2. \tag{48}$$

For embodiments described herein, the signal-to-noise ratio may be improved by using multiply-entangled photons (e.g., entangled triples or generally, entangled n-tuples for $n \geq 2$ of photons). By way of non-limiting example, consider a multiply-entangled-photon beam that includes one signal photon beam and two idler photon beams, with each signal photon entangled with two idler photons. The signal photon beam is sent to the target object and its reflection is collected. Each of the idler photon beams pass through identical delay elements and cavities before being detected, each at their own detector. In general, an N-photon accidental coincidence rate may be represented as, by way of non-limiting example:

$$\Phi_{cc\_bg} = \eta_s\eta_i^{N-1}\Phi_{cav}^N T_c^{N-1} = \eta_s\eta_i^{N-1}\Phi_{bi}^N T_c^{N-1}\frac{(1-R)^N}{(1+R)^N}. \tag{49}$$

In equation (49), N represents the total number of entangled photons per entangled-photon set. In contrast, the N-photon coincidence rate may be approximated as, by way of non-limiting example:

$$\Phi_{cc\_multi} \approx \eta_s\eta_i^{N-1}\Phi_{bi}\frac{(1-R)^N}{(1+R)^N}. \tag{50}$$

Each additional entangled photon thus improves the discrimination against accidental coincidences by a factor of $\Phi_{bi}T_c$, which could be several orders of magnitude.

An advantage of the techniques described herein is that distances may be determined in a manner that is undetectable by third parties. In particular, signal photons are sent to be reflected off of the target object. However, the signal photons as used herein are broadband and relatively low-flux. Although the signal and corresponding idler photon frequencies sum to a constant (the pump beam frequency), the frequencies of the individual signal and idler photons are distributed. Moreover, entangled-photon range finding does not require the emission of easily-detectable coherent radiation. Thus, in contrast with RADAR and LIDAR, the techniques disclosed herein may be used to measure distances with minimal threat of detection by other parties.

In embodiments of the present invention, the nominal range is preferably set to be approximately equal to the range to the target object. This may be accomplished by guessing or by other methods. The nominal range may be set by using prior and/or real-time information about any, or a combination of, the target object's location, its momentum, its velocity, its physical condition, and its physical properties. Conventional range-finding methods that give a gross approximation of the target object's range may be used to set the nominal range, and the techniques discussed herein may be used to more accurately find the range once the nominal range is set. This alternative is particularly useful if such conventional methods are highly difficult (or impossible, e.g., passive observation) to detect.

For the embodiments described herein, portions of one embodiment may be substituted, replaced, or inserted into other embodiments. That is, the teachings disclosed herein should be viewed collectively, with each embodiment capable of employing technologies drawn from other embodiments. By way of non-limiting example, the following embodiment portions or features may be used in embodiments other than those with respect to which they are explicitly discussed: optical coil bank, electronic coincidence counter, BSM, same-direction intra-cavity photon propagation, different-direction intra-cavity photon propagation, multiple cavities, and synchronized signal and idler photons.

The various calculations and judgments required during operation to determine ranges according to embodiments of the present invention may be accomplished by conventional computer hardware or software. These calculations are preferably performed automatically during the normal course of operation of embodiments of the present invention. By way of non-limiting example, the computations associated with the following equations as used to determine ranges may be performed by standard computer hardware or software: equations (1), (2), (3), (12), (15), and (23)-(31) (including algorithm (27)).

Note that in any of the embodiments described herein, either the signal photons or the idler photons may be sent to the target object. If the idler photons are sent to the target object, the signal photons will be retained at the range finder and delayed using any of the techniques discussed herein. More generally, the terms "signal" and "idler" may be used interchangeably.

Note also that instead of using multiple cavities at once to synthesize a larger effective cavity, the embodiments disclosed herein may use sequential measurements. In such a configuration, the optical lengths of the cavity may be changed between measurements. Alternately, various cavities of different lengths or a bank of cavities may be interchanged for different measurements. Interchanging cavities may be accomplished by way of electro-optical ½-wave plates. Further, an iterative process may be employed where the range finding apparatus uses several different cavity lengths to home in on an object's distance.

By way of elaborating on earlier definitions, entanglement time is a quantity associated with the spread in phase differences between signal and associated idler photons. That is, entanglement time relates to the collection of differences in phase between signal and associated idler photons produced by an entangled-photon source (e.g., a non-linear crystal). Entanglement time may be, by way of non-limiting example, considered as the average time difference between when ordinary and extraordinary rays leave a nonlinear crystal. Ordinary rays leaving a nonlinear crystal are typically associated with signal photons, and extraordinary rays leaving a nonlinear crystal are typically associated with idler photons. By way of non-limiting example, entanglement time is a function of the length l of a non-linear crystal used to produce the entangled photons, and may be described as $T_e = l(n_o - n_e)/2c$, where $n_o$, $n_e$ are indices of refraction associated with ordinary and extraordinary crystal directions, respectively. By way of non-limiting example, entanglement times on the order of $T_e = 5 \times 10^{-13}$ seconds are possible with a crystal length of 5 mm. These parameters yield an entanglement distance (the distance that light can travel during the entanglement time) of 0.15 mm. Much shorter entanglement times (e.g., on the order of microns) are also possible.

Entangled photons may be produced according to a variety of methods. Those of ordinary skill in the art are capable of producing entangled-photon pairs, triples, etc. By way of non-limiting example, entangled photons may be produced according to types I or II parametric downconversion. That is, biphotons whose constituent signal and idler photons are orthogonally polarized may be used as well as biphotons whose constituent signal and idler photons are polarized in parallel. For type-I downconversion, signal photons may be separated from idler photons (and recombined with idler photons) using dichroic glass. For both types of downconversion, signal photons and idler photos may be selected as they exit the biphoton source by providing apertures at the appropriate angles. Any nonlinear crystal, not limited to BBO, may be used. Other ways to produce entangled photons include: excited gasses, materials without inversion symmetry, and generally any properly phase-matched medium. Entangled-photon production consistent with this disclosure is not limited to using BBO or any other particular non-linear crystal. Furthermore, the entangled photons are not limited to any particular wavelength or frequency.

In alternate embodiments of the present invention that employ a BSM, various indicia of entangled-photon absorption by the BSM may be used to detect entangled photons. By way of non-limiting example, entangled-photon absorption may result in fluorescence, phosphorescence, direct electron transfer, or ionization of the absorbing material. Detecting fluorescence, phosphorescence, direct electron transfer, or ionization may be used to detect entangled-photon absorption. Also by way of non-limiting example, avalanche photodiodes, photo multiplier tubes, or other devices may be used to detect the fluorophotons, ionization, direct electron transfer, or other absorption indicia.

In alternate embodiments of the invention, the BSM is not limited to rubidium-87. By way of non-limiting example, any material with appropriately structured energy levels, such as cesium-133 ($^{133}Cs$) or other alkalis may be used. Preferably, such materials are those with a very narrow multi-photon absorption linewidth. More preferably, such materials are those with a very narrow multi-photon transition to an excited state that decays through a path that includes a radiative transition. Further, embodiments of the invention are not limited to any particular entangled-two-photon absorption or random-two-photon absorption electron energy level transition. Pump, signal, and idler photon frequencies and wavelengths may vary from those disclosed herein.

The equations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

The particular optical manipulation devices depicted herein are illustrative and representative and are not meant to be limiting. By way of non-limiting example, prisms, apertures, filters, optical fiber, lenses, and particular lasers disclosed herein may be replaced with devices known to those of ordinary skill in the art.

Alternate embodiments of the present invention may delay one photon in various ways. By way of non-limiting example, a length of optical fiber may be inserted into the path of one or both photons. Alternately, sets of mirrors may be used to increase the path length of one or both photons. For electronic coincidence counting embodiments, electronic detection delays (i.e., coincidence delays) may be used. Other techniques for delaying one or more photons may also be used.

Note that this disclosure follows standard physics notational conventions. By way of non-limiting example, in some places Planck's constant h and the speed of light c may both considered to be one (1) for the purpose of calculations. This convention allows, inter alia, for common units for frequency and energy, as well as common units for time and distance (e.g., temporal delays may be considered as spatial lengths and vice versa). This notational convention is accounted for after calculations have been performed in order to deduce correct units for application purposes. This disclosure also uses Dirac bracket notation (e.g., $|\psi_i\rangle$), known to those of ordinary skill in the art, to denote quantum states.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

What is claimed is:

1. A method of estimating a distance to an object, the method comprising:

generating a first photon and a second photon simultaneously;

directing the first photon at an object;

receiving the first photon reflected off of the object;

directing at least the second photon to an optical cavity; and detecting an arrival of the first photon and an arrival of the second photon;

wherein the detecting is used together with an optical cavity length parameter to estimate a distance to the object.

2. The method of claim 1 wherein the detecting comprises detecting using electronic photon detectors.

3. The method of claim 1 wherein the detecting comprises detecting using an entangled photon sensitive material.

4. A method of estimating a distance to an object, the method comprising:

generating a plurality of first photons and a plurality of second photons, each of the plurality of first photon being associated with one of the plurality of second photons;

directing at least a first portion of the first photons to the object;

receiving a reflected portion of the first photons reflected off the object;

directing at least a second portion of the second photons to a cavity; and detecting a correlation between at least some photons in the reflected portion and at least some photons in the second portion; and using the correlation together with an optical cavity length parameter to estimate the distance to the object.

5. The method of claim 4 wherein the detecting comprises detecting using a coincidence counter.

6. The method of claim 5 wherein the coincidence counter detects a temporal correlation between arrival times, at a first detector, of at least some photons in the reflected portion and arrival times, at a second detector, of at least some photons in the second portion.

7. The method of claim 6 wherein the temporal correlation comprises a temporal translation.

8. The method of claim 4 wherein the detecting comprises detecting using a biphoton sensitive material.

9. The method of claim 8 wherein the correlation comprises spatial collocation of the at least some photons in the reflected portion and the at least some photons in the second portion.

10. The method of claim 4 wherein the distance to the object is found as a remainder of an actual distance to the object upon being divided by a length of the cavity.

11. The method of claim 4 further comprising directing at least a third portion of the second photons to a second cavity.

12. The method of claim 11 further comprising detecting a second correlation between at least some photons in the reflected portion and at least some photons in the third portion.

13. The method of claim 12 wherein the correlation and the second correlation are used to estimate the distance to the object.

14. The method of claim 4 further comprising delaying at least a third portion of the second portion.

15. The method of claim 4 further comprising spectral filtering.

16. The method of claim 4 wherein the cavity is one in a first pair of cavities, the method further comprising directing at least a second portion of the second photons and at least some of the reflected portion of the first photons to the first pair of cavities and to a second pair of cavities.

17. The method of claim 4 further comprising using a binary coil bank.

18. A method of estimating a distance to an object modulo a cavity length parameter, the method comprising:

generating a first photon and a second photon, the first photon and the second photon being entangled;

directing the first photon at an object;

receiving the first photon reflected off of the object;

causing the second photon to travel a known distance;

directing at least the second photon to an optical cavity;

detecting an arrival of the first photon and an arrival of the second photon; and calculating a distance to the object modulo a cavity length parameter based on at least the known distance and the detecting;

wherein the calculating is used to estimate the distance to the object.

19. The method of claim 18 wherein the distance is less than the cavity length parameter.

20. The method of claim 18 wherein the cavity length parameter is an optical length of an optical cavity.

21. The method of claim 18 wherein the cavity length parameter is a length associated with a plurality of optical cavities.

22. The method of claim 21 wherein the length associated with a plurality of optical cavities is an effective cavity length.

23. The method of claim 18 wherein the optical cavity is one in a first pair of optical cavities, the method further comprising directing the first photon and the second photon to a detector comprising the first pair of optical cavities and a second pair of optical cavities.

24. The method of claim 18 further comprising spectral filtering.

25. A system for estimating a distance to an object, the system comprising:

an entangled photon source, the entangled photon source configured to produce a first photon simultaneously with a second photon;

optics configured to direct the first photon to an object;

optics configured to receive the first photon reflected off of the object;

an optical cavity configured to receive the second photon;

a detector configured to detect an arrival of the first photon and an arrival of the second photon and produce a signal in response thereto; and a processor configured compute an estimated distance to the object based in part on the signal and an optical cavity length parameter.

26. The system of claim 25 wherein the detector comprises at least one electronic photon detector.

27. The system of claim 25 wherein the detector comprises an entangled photon sensitive material.

28. A system for estimating a distance to an object, the system comprising:

a source of photons configured to generate a plurality of first photons and a plurality of second photons, each of the plurality of first photon being associated with one of the plurality of second photons;

optics configured to direct at least a first portion of the first photons to the object;

optics configured to receive a reflected portion of the first photons reflected off the object;

a cavity configured to receive at least a second portion of the second photons;

a detector configured to produce a signal in response to detecting a correlation between at least some photons in the reflected portion and at least some photons in the second portion; and a processor configured to estimate the distance to the object based at least on the signal and an optical cavity length parameter.

29. The system of claim 28 wherein the detector comprises a coincidence counter.

30. The system of claim 29 wherein the coincidence counter is configured to detect a temporal correlation between arrival times, at a first detector, of at least some photons in the reflected portion and arrival times, at a second detector, of at least some photons in the second portion.

31. The system of claim 30 wherein the temporal correlation comprises a temporal translation.

32. The system of claim 28 wherein the detector comprises a biphoton sensitive material.

33. The system of claim 32 wherein the correlation comprises spatial collocation of the at least some photons in the reflected portion and the at least some photons in the second portion.

34. The system of claim 28 wherein the processor is configured to calculate a remainder of the distance to the object upon being divided by a length of the cavity.

35. The system of claim 28 further comprising a second cavity configured to receive at least a third portion of the second photons.

36. The system of claim 35 further comprising a detector configured to produce a second signal in response to detecting a second correlation between at least some photons in the reflected portion and at least some photons in the third portion.

37. The system of claim 36 wherein the processor is configured to use the signal and the second signal to estimate the distance to the object.

38. The system of claim 28 further comprising a delay configured to delay at least a third portion of the photons in the second portion.

39. The system of claim 28 further comprising a spectral filter configured to accept at least some of the second portion of the second photons.

40. The system of claim 28 wherein the cavity is one in a first pair of cavities configured to receive at least some of the second portion of the second photons and at least some of the reflected portion of the first photons, the system further comprising a second pair of cavities configured to receive at least some of the second portion of the second photons and at least some of the reflected portion of the first photons.

41. The system of claim 28 further comprising a binary coil bank configured to delay at least some of the second portion of the second photons.

42. A system for estimating a distance to an object modulo a cavity length parameter, the system comprising:
  a source of entangled photons configured to produce a first photon and a second photon, the first photon and the second photon being entangled;
  optics configured to direct the first photon to an object;
  optics configured to receive the first photon reflected off of the object;
  an optical path configured to cause the second photon to travel a known distance;
  optical cavity configured to receive at least the second photon;
  a detector configured to detect an arrival of the first photon and an arrival of the second photon; and
  a processor configured to compute an estimated distance to the object modulo a cavity length parameter based on at least the known distance and a signal produced by the detector;
  whereby the processor is configured to use the estimated distance to the object modulo a cavity length to estimate the actual distance to the object.

43. The system of claim 42 wherein the cavity length parameter is an optical length of an optical cavity.

44. The system of claim 42 wherein the cavity length parameter is a length associated with a plurality of optical cavities.

45. The system of claim 44 wherein the length associated with a plurality of optical cavities is an effective cavity length.

46. The system of claim 42 wherein the optical cavity is one in a first pair of cavities, the system further comprising a second pair of cavities, the first pair of cavities and the second pair of cavities configured to receive the first photon and the second photon.

47. The system of claim 42 further comprising a spectral filter configured to receive at least one of the first photon and the second photon.

48. A system for estimating a distance to an object, the system comprising:
  means for producing entangled photons, the entangled photons comprising a first photon and a second photon;
  means to direct the first photon to an object;
  means to receive the first photon reflected off of the object;
  optical cavity means for allowing the first photon to repeatedly travel a known distance;
  means for detecting an arrival of the first photon and an arrival of the second photon and for producing a signal in response thereto; and
  processor means for computing an estimated distance to the object based in part on the signal and an optical cavity length parameter.

* * * * *